(12) United States Patent
Baas et al.

(10) Patent No.: US 12,502,703 B2
(45) Date of Patent: Dec. 23, 2025

(54) MULTI-TUBULAR BEAM FOR A VEHICLE

(71) Applicant: Shape Corp., Grand Haven, MI (US)

(72) Inventors: Douglas S. Baas, Zeeland, MI (US); Joseph R. Matecki, Allendale, MI (US); Shawn R. Jasman, Coopersville, MI (US)

(73) Assignee: Shape Corp., Grand Haven, MI (US)

( * ) Notice: Subject to any disclaimer, the term of this patent is extended or adjusted under 35 U.S.C. 154(b) by 440 days.

(21) Appl. No.: 18/309,168

(22) Filed: Apr. 28, 2023

(65) Prior Publication Data

US 2023/0264246 A1    Aug. 24, 2023

Related U.S. Application Data

(63) Continuation of application No. 17/094,429, filed on Nov. 10, 2020, now Pat. No. 11,660,652, and a
(Continued)

(51) Int. Cl.
*B60R 19/18* (2006.01)
*B21C 37/08* (2006.01)
(Continued)

(52) U.S. Cl.
CPC .............. *B21D 5/086* (2013.01); *B21C 37/08* (2013.01); *B60R 19/023* (2013.01); *B60R 19/03* (2013.01);
(Continued)

(58) Field of Classification Search
CPC .................. B60R 19/023; B60R 19/18; B60R 2019/1826; B60R 19/04; B60R 19/12; B60R 2019/1813
(Continued)

(56) References Cited

U.S. PATENT DOCUMENTS 2,171,540 A    9/1939  Calkins et al.
2,991,520 A    7/1961  Dalton
(Continued)

FOREIGN PATENT DOCUMENTS

CN    102574182 A    7/2012
CN    102958641 A    3/2013
(Continued)

OTHER PUBLICATIONS

"Welding Galvanized Steel-Safely", Sperko Engineering Services, Inc., 1999.
(Continued)

*Primary Examiner* — Roger L Pang
(74) *Attorney, Agent, or Firm* — Bodman PLC

(57) ABSTRACT

A multi-tubular beam for a vehicle, such as a vehicle structure or a bumper reinforcement, includes an elongated beam formed with a metal sheet. The metal sheet has a central section and outer sections extending along a length of the metal sheet. The outer sections are disposed in opposing directions from the outer edges of the central section to provide adjacent first and second tubular portions. The central section forms a common center wall between the adjacent first and second tubular portions. A first edge portion of the metal sheet is disposed along and in parallel alignment with the center wall. The first edge portion is attached to the center wall at a first weld joint to form the first tubular portion. The first weld joint includes a weld material that extends through a thickness of the center wall and into a thickness of the first edge portion.

20 Claims, 18 Drawing Sheets

Related U.S. Application Data continuation of application No. 16/695,506, filed on Nov. 26, 2019, now Pat. No. 11,427,144.

(60) Provisional application No. 62/812,684, filed on Mar. 1, 2019, provisional application No. 62/771,843, filed on Nov. 27, 2018.

(51) Int. Cl.
  *B21D 5/08* (2006.01)
  *B60R 19/02* (2006.01)
  *B60R 19/03* (2006.01)
  *B22F 10/28* (2021.01)

(52) U.S. Cl.
  CPC .............. *B60R 19/18* (2013.01); *B22F 10/28* (2021.01); *B60R 2019/1826* (2013.01)

(58) Field of Classification Search
  USPC .................. 293/102, 120, 122, 146, 155
  See application file for complete search history.

(56) References Cited

U.S. PATENT DOCUMENTS

| | | | |
|---|---|---|---|
| 4,236,568 A | 12/1980 | Larson | |
| 5,104,032 A | 4/1992 | Spies et al. | |
| 5,305,625 A | 4/1994 | Heinz | |
| 5,395,036 A | 3/1995 | Sturrus | |
| 5,454,504 A | 10/1995 | Sturrus | |
| 5,669,992 A | 9/1997 | Bronsema et al. | |
| 5,813,594 A | 9/1998 | Sturrus | |
| 5,829,666 A | 11/1998 | Takeda et al. | |
| 6,135,343 A | 10/2000 | Thoerngren et al. | |
| 6,217,089 B1 | 4/2001 | Goto et al. | |
| 6,545,246 B2 | 4/2003 | Kummle | |
| 6,575,198 B2 | 6/2003 | Yoshitoshi et al. | |
| 6,774,339 B1 | 8/2004 | Smathers et al. | |
| 6,813,920 B2 | 11/2004 | Yoshida et al. | |
| 8,530,783 B2 | 9/2013 | Ow et al. | |
| 8,716,624 B2 | 5/2014 | Johnson et al. | |
| 8,872,060 B2 | 10/2014 | Johnson et al. | |
| 9,381,880 B2 | 7/2016 | Matecki et al. | |
| 9,669,786 B2 | 6/2017 | Johnson et al. | |
| 9,988,005 B2 * | 6/2018 | Palo | B60R 19/18 |
| 10,155,493 B2 | 12/2018 | Matecki et al. | |
| 2003/0230129 A1 | 12/2003 | Yoshida et al. | |
| 2004/0130166 A1 | 7/2004 | Trancart et al. | |
| 2005/0162631 A1 | 7/2005 | Graber | |
| 2007/0074556 A1 | 4/2007 | Heatherington | |
| 2009/0258105 A1 | 10/2009 | Thierjung et al. | |
| 2012/0074720 A1 | 3/2012 | Johnson et al. | |
| 2013/0087540 A1 | 4/2013 | Gu et al. | |
| 2014/0361558 A1 | 12/2014 | Malkowski et al. | |
| 2014/0377484 A1 | 12/2014 | Oxley et al. | |
| 2015/0083356 A1 | 3/2015 | Longa et al. | |
| 2015/0360733 A1 | 12/2015 | Nagwanshi et al. | |
| 2017/0259767 A1 | 9/2017 | Johnson et al. | |
| 2019/0143919 A1 | 5/2019 | Miura et al. | |
| 2020/0164820 A1 | 5/2020 | Baas et al. | |
| 2020/0262372 A1 * | 8/2020 | Herisson | B21D 53/88 |
| 2023/0062947 A1 * | 3/2023 | Matecki | B23K 9/025 |
| 2024/0351091 A1 * | 10/2024 | Chao | B21D 53/88 |

FOREIGN PATENT DOCUMENTS

| | | |
|---|---|---|
| CN | 104148539 A | 11/2014 |
| CN | 206336331 U | 7/2017 |
| CN | 107074175 A | 8/2017 |
| CN | 109436092 A | 3/2019 |
| CN | 209290332 U | 8/2019 |
| DE | 19525347 C1 | 7/1996 |
| EP | 1378402 A1 | 1/2004 |
| EP | 3305458 A1 | 4/2018 |
| EP | 3030462 B1 | 10/2018 |
| EP | 3197727 B1 | 12/2018 |
| FR | 2731373 A1 | 9/1996 |
| JP | S60255294 A | 12/1985 |
| JP | 2000246445 A | 9/2000 |
| JP | 2013530048 A | 7/2013 |
| KR | 20100035451 A | 4/2010 |
| KR | 20110011082 A | 2/2011 |
| KR | 20120050213 A | 5/2012 |
| KR | 101334621 B1 | 11/2013 |
| WO | 9908829 A1 | 2/1999 |
| WO | 2012000106 A1 | 1/2012 |
| WO | 2018092058 A1 | 5/2018 |

OTHER PUBLICATIONS

International Search Report for application No. PCT/US2019/063186; mailed Feb. 10, 2020; 4 pp.

International Search Report for application No. PCT/US2021/025748 mailed Jul. 1, 2021, 3 pp.

Chen, W., Chen, W., "CO2 laser welding of galvanized steel sheets using vent holes", Materials and Design, London, GB, vol. 30, No. 2; Feb. 1, 2009.

Gu, Hongping, Gu, Hongping, "Laser lap welding of zinc coated steel sheet with laser-dimple technology", Journal of Laser Applications 22, 87, 2010.

Livelli, Gregory, Livelli, Gregory, "Guideline for Welding Galvanized Steel", PCI Journal, May-Jun. 1998; pp. 40-48.

Narayana, Badri K., Narayana, Badri K., "Solutions for Welding Zinc Coated Steels", The Lincoln Electric Company, Cleveland, OH, 2015.

Ozkat, Erkan C., Ozkat, Erkan C., "Laser dimpling process parameters selection and optimization using surrogate-driven process capability space", Optics & Laser Technology, 93; pp. 149-164, 2017.

\* cited by examiner

S25

S36

S26

S37

S27

S38

S28

S39

S29

S40

S30

S41

S31

S42

S32

S43

S33

S44

S34

S45

S35

S46

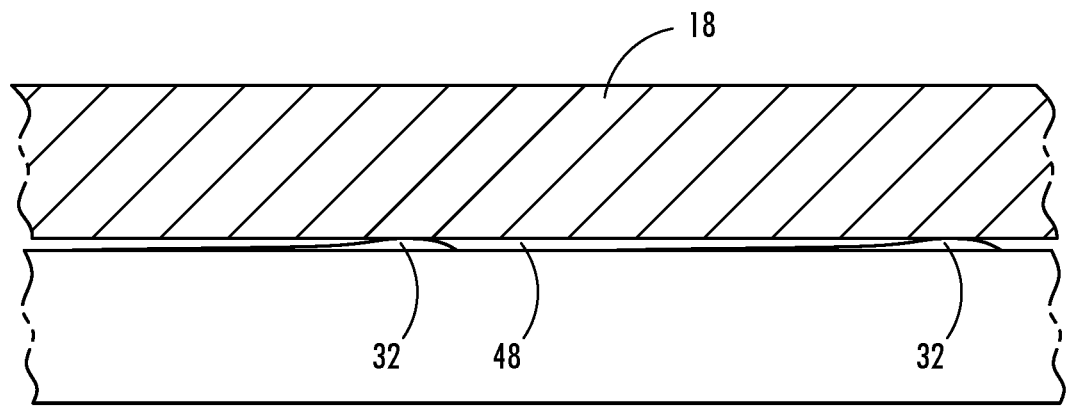
FIG. 7E
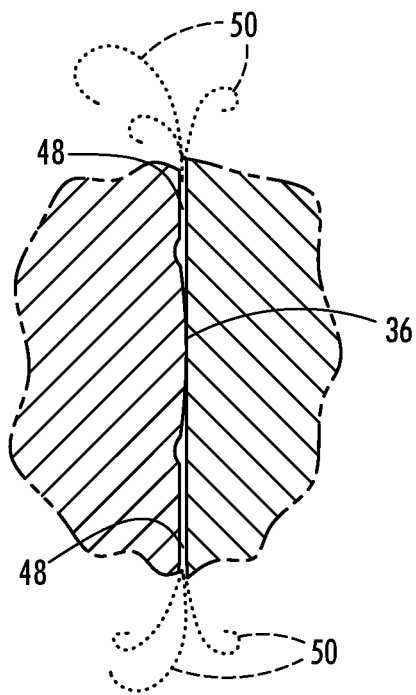 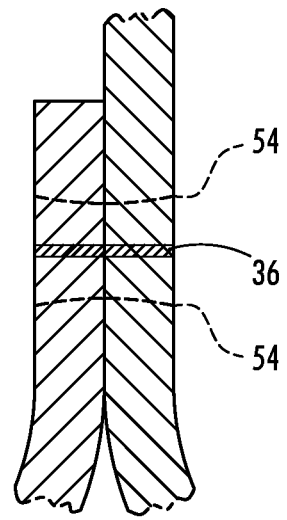
FIG. 7F      FIG. 7G

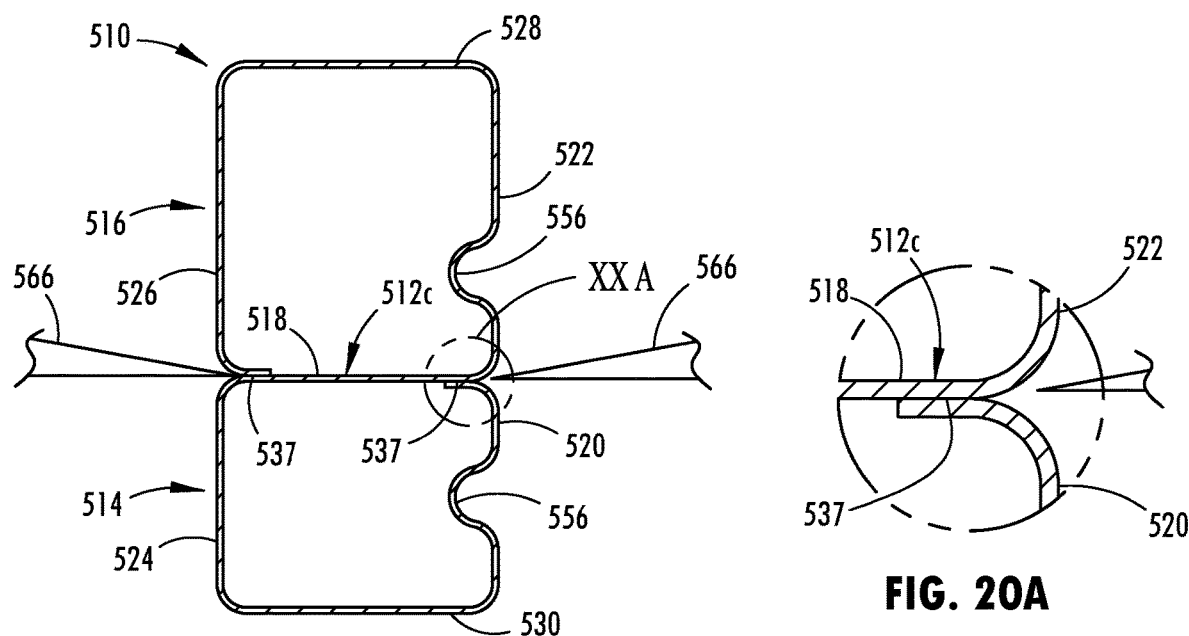
FIG. 20
FIG. 20A
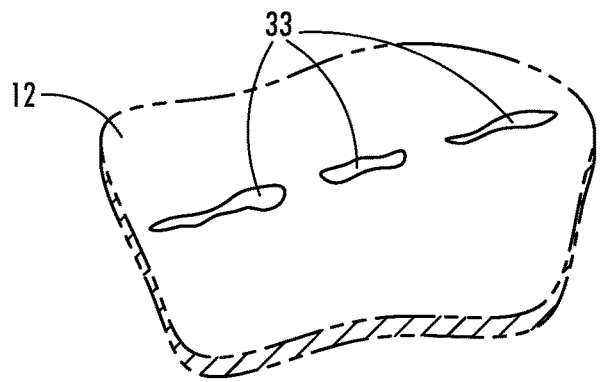
FIG. 21
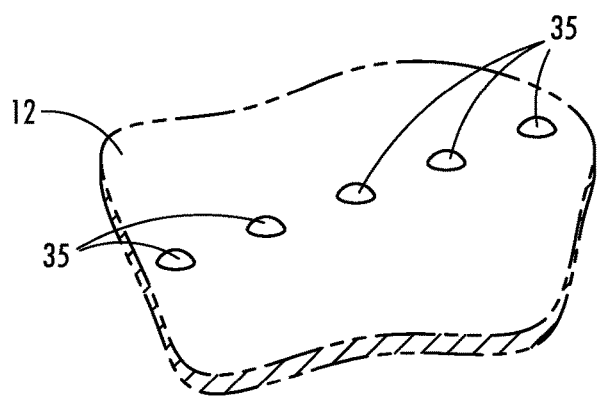
FIG. 22

MULTI-TUBULAR BEAM FOR A VEHICLE

CROSS-REFERENCE TO RELATED APPLICATION

This application is a continuation of U.S. Non-provisional application Ser. No. 17/094,429, filed Nov. 10, 2020, which is a continuation of U.S. Non-provisional application Ser. No. 16/695,506, filed Nov. 26, 2019, which claims benefit and priority under 35 U.S.C § 119(e) to U.S. Provisional Patent Application No. 62/771,843, filed Nov. 27, 2018, and to U.S. Provisional Patent Application No. 62/812,684, filed Mar. 1, 2019, the disclosures of these prior applications are considered part of this application and are hereby incorporated by reference in their entireties.

TECHNICAL FIELD

The present disclosure relates to vehicle structural and reinforcement beams and associated methods of roll form manufacturing and metal processing.

BACKGROUND

Vehicles are subjected to various tests that are mandated by government regulations and insurance certifications, such as tests for impact energy management and absorption. The results of these tests may be dependent on various vehicle components and structural designs, including bumper assemblies and structural reinforcement beams. More specifically, test results can rely on both the cross-sectional geometry and weld quality of these beams.

It is known to galvanize or apply protective zinc coatings to steel components of a vehicle to prevent rust or iron oxide from forming on the steel components over time. It is also generally known that welding galvanized metal creates zinc oxide fumes when the zinc layer or coating is burned off or evaporated from the steel component at or near the weld joint from the high heat used in some forms of welding. The zinc oxide fumes generated during welding can be ventilated from an area surrounding the weld joint, but if such fumes are not properly ventilated, they can be hazardous to operators and jeopardize the quality of the weld, such as if the zinc oxide penetrates the molten metal at a weld joint.

SUMMARY

According to one aspect of the present disclosure, a multi-tubular beam for a vehicle, such as a vehicle structure or a bumper reinforcement, includes an elongated beam formed with a metal sheet. The metal sheet has a central section and outer sections extending from opposing outer edges of the central section along a length of the metal sheet. The outer sections have bends along the length that dispose the outer sections in opposing directions from the outer edges of the central section to provide adjacent first and second tubular portions that extend along the central section of the metal sheet. The central section forms a common center wall between the adjacent first and second tubular portions. A first edge portion of the metal sheet is disposed along and in parallel alignment with the center wall. The first edge portion is attached to the center wall at a first weld joint to form the first tubular portion. The first weld joint includes a weld material that extends through a thickness of the center wall and into a thickness of the first edge portion. A second edge portion of the metal sheet is disposed against a side wall of the first tubular portion. The second edge portion attached to the side wall at a second weld joint to form the second tubular portion.

Implementations of the disclosure may include one or more of the following optional features. In some implementations, the weld material of the first weld joint includes molten metal of the first edge portion and the center wall, such as formed from a laser directed at an end section of the center wall that overlaps with the first edge portion. For example, the weld material of the first weld joint may extend perpendicular to the center wall. The first weld joint includes a heat affect zone that extends outward from opposing sides of the weld material, such that the heat affect zone may have a width less than 2 mm or between 1 mm and 2 mm.

In some implementations, the second weld joint includes a second weld material that extends through a thickness of the second edge portion and into a thickness of the side wall. For example, the second weld material may extend perpendicular to the side wall of the first tubular portion, such as where the side wall is disposed perpendicular to the center wall of the elongated beam. The second weld material of the second weld joint may include molten metal of the second edge portion and the side wall that is formed from a laser directed at the second edge portion that overlaps with the side wall.

According to another aspect of the present disclosure, a multi-tubular beam for a vehicle includes an elongated beam having a metal sheet with a central section and outer sections extending from opposing outer edges of the central section along a length of the metal sheet. The outer sections have bends along the length that dispose the outer sections in opposing directions from the outer edges of the central section to provide adjacent first and second tubular portions that extend along the central section of the metal sheet. The central section forms a common center wall between the adjacent first and second tubular portions. A first edge portion of the metal sheet is defined between an outer edge of the metal sheet and a bend corner of the first tubular portion that is disposed at an end of the center wall. The first edge portion is attached to the center wall at a first weld joint to enclose the first tubular portion. The first weld joint includes a weld material that extends through a thickness of the center wall and into a thickness of the first edge portion. The weld material of the first weld joint comprising molten metal of the first edge portion and the center wall that is formed from a laser directed at an end section of the center wall that overlaps with the first edge portion.

According to yet another aspect of the disclosure, a method of forming a multi-tubular beam involves uncoiling a metal sheet in a generally horizontal plate into a roll former. The metal sheet has a central section and first and second outer sections on opposing sides of the central section along a length of the metal sheet, where the first outer section has a first edge portion of the and the second outer section has an opposing second edge portion of the metal sheet. The metal sheet is roll formed successively with a first series of forming rolls of the roll former. The first series of forming rolls forms the first outer section of the metal sheet to dispose the first edge portion of the metal sheet into contact with the central section to form a first tubular portion. The first edge portion is welded to the central section of the metal sheet to form a first weld joint that encloses the first tubular portion, where the first weld joint includes a weld material that extends through a thickness of the central section and into the first edge portion. After forming the first weld joint, the metal sheet roll formed successively with a second series of forming rolls of the roll former. The second series of forming rolls form the second outer section of the metal sheet to dispose the second edge portion of the metal sheet into contact with the first tubular portion to form a second tubular portion. The second edge portion is welded to the first tubular portion to form a second weld joint that encloses the second tubular portion. The central section of the metal sheet is disposed between the first and second tubular portions to form a common center wall.

These and other objects, advantages, purposes, and features of the present disclosure will become apparent upon review of the following specification in conjunction with the drawings.

BRIEF DESCRIPTION OF THE DRAWINGS

FIG. 7E is a cross-sectional view of the beam taken along the seam prior to being welded closed, taken along line VIIE-VIIE in FIG. 7D;

FIG. 7F is an enlarged view of the weld being formed at section VIIF in FIG. 7D;

FIG. 7G is an enlarged view of the post-formed weld of FIG. 7F, showing a narrow heat affect zone;

FIG. 20 is a cross-sectional view of an additional reinforcement beam;

FIG. 20A is an enlarged view of a weld being formed at section XXA in FIG. 20;

FIG. 21 is a schematic perspective view of an example of protrusions disposed over an upper surface of metal sheet stock; and FIG. 22 is a schematic perspective view of another example of protrusions disposed over an upper surface of metal sheet stock.

DETAILED DESCRIPTION

Figure 1:
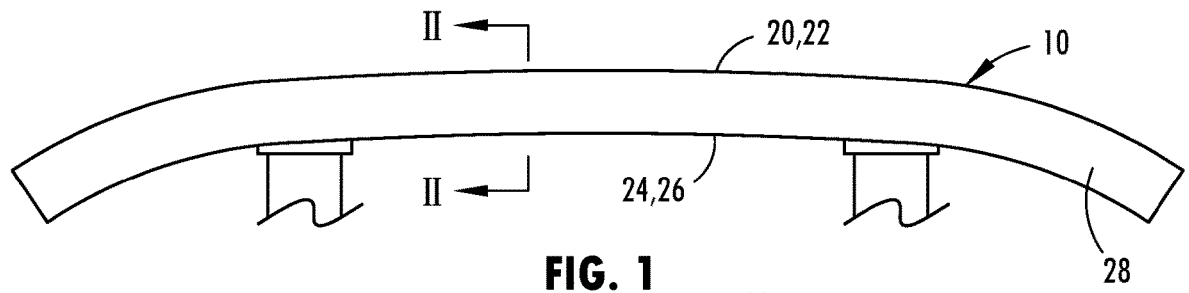
FIG. 1 is a top plan view of a bumper reinforcement beam supported by crush cans at a vehicle frame in accordance with one or more embodiments illustrated herein.

Referring now to the drawings and the illustrative embodiments depicted therein, a galvanized beam 10 may be generally continuously formed with a roll forming process that has a method of continuously welding a seam or seams of the beam 10 closed in a manner that ventilates zinc oxide fumes generated within enclosed areas of the beam 10 when welding the galvanized sheet stock used to form the beam 10. The galvanized multi-tubular beam 10 may be used for a vehicle structural reinforcement or a bumper reinforcement, such as shown in FIG. 1 where the beam 10 is longitudinally curved with varying degrees of curvatures in order to correspond with a bumper design of a particular vehicle. When used as a bumper reinforcement, the beam 10 may be attached to crush cans disposed at the front of the vehicle frame so as to span across the width of the vehicle frame. Alternatively, the beam described herein may be adapted for various alternative structural or reinforcement applications, whether linear or curved, such as a rear bumper, a door impact beam, a frame member (e.g., a roof bow, a header, a pillar, a rocker rail, a seat member, or the like), and a frame member for a vehicle battery tray support, among other conceivable vehicle and non-vehicle related members and components.

Figure 2:
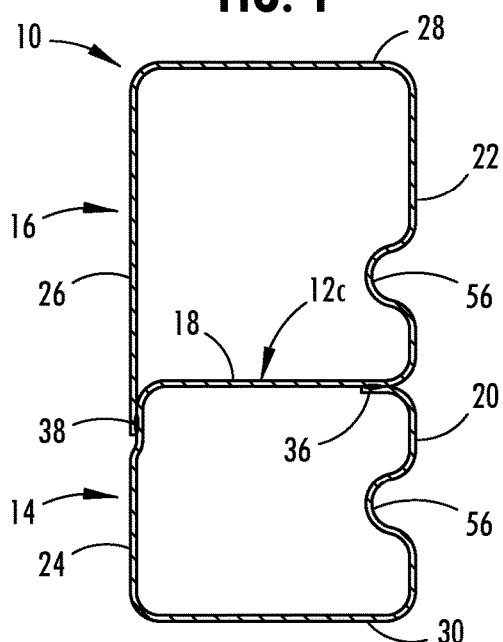
FIG. 2 is a cross-sectional view of the reinforcement beam along line II-II in FIG. 1.
Figure 3:
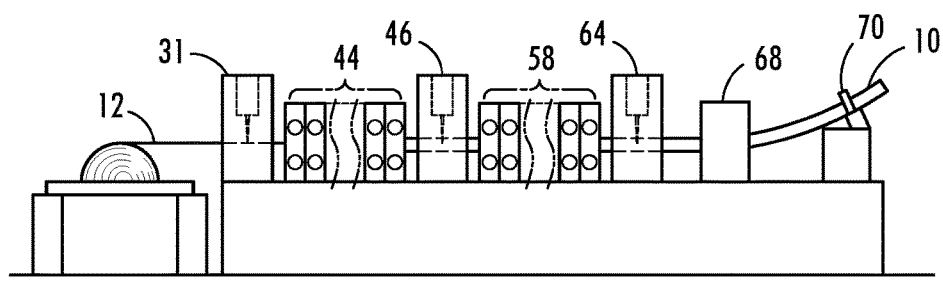
FIG. 3 is a schematic elevational view of an apparatus configured to manufacture the present reinforcement beam.

The beam 10 may be manufactured by roll forming a galvanized metal sheet 12, such as shown uncoiling from a roll in FIG. 3, to form two adjacent tubular portions 14, 16 that share a common center wall 18 of the beam 10. The outer sections 12a, 12c of the metal sheet 12 that form the two adjacent tubular portions 14, 16 extend from opposing sides of a center section 12b of the metal sheet 12 that forms the common center wall 18 of the beam, where such sections may be initially delineated at forming step S2 of FIG. 4A. Once the beam 10 is formed, the two adjacent tubular portions 14, 16 of the beam 10 are defined, such as oriented in FIGS. 1 and 2, by front walls 20, 22, rear walls 24, 26, an upper wall 28, and a lower wall 30. The front walls 20, 22 of the adjacent tubular portions 14, 16 are substantially aligned with each other so as to form an outward facing or impact surface of the beam when used as a bumper reinforcement beam. Similarly, the rear walls 24, 26 are in general alignment with each other and are substantially parallel with the front walls 20, 22. Further, the upper and lower walls 28, 30 are substantially parallel with each other and the center wall 18 and generally perpendicular with the front and rear walls 20, 22, 24, 26. It is understood that additional embodiments of the beam may assume various shapes and orientations from that shown in FIG. 2 and may include alternatively dimensional proportions, such as for different applications of the beam.

Referring now to FIG. 3, as the galvanized sheet stock 12 is uncoiled from the roll, protrusions 32 may be formed at an upper surface of the sheet stock 12, such as at a laser head station 31 ahead of the roll forming line. It is also contemplated that the protrusions may alternatively be formed at a separate processing line from the roll forming line, such as by re-coiling the sheet after forming the protrusions and then moving the coiled roll to the roll forming line. Alternatively, the protrusions may be formed inline or during the roll forming process, such as immediately prior to welding, so as to reduce the risk of the protrusions being deformed by the roll former stations.

The laser head station 31 shown in FIG. 3 may form the protrusions or dimples 32 at generally consistent intervals along a generally straight line longitudinally along in alignment with a length of the formed beam 10. It is understood that the spacing or intervals between the protrusions may vary along the beam. It is also conceivable that the protrusions may be formed by alternative devices, for example, by deforming the sheet mechanically, such as with a serrated disk, a stamping device, or other conceivable means.

Furthermore, the protrusions may be disposed at the sheet with electrospark deposition (ESD) (i.e., pulsed fusion surfacing or pulsed electrode surfacing), such as shown in FIG. 21, where a pulsed micro-welding process provides intermittent ESD material 33 disposed at and protruding from a planar surface of the galvanized metal sheet 12. These protrusions 33 likewise create ventilation openings for zinc oxide fumes generated from welding to escape the interior of the respective tubular portion of the formed beam. Also, the protrusions may be disposed at the sheet with additive manufacturing (i.e., 3D printing), such as shown in FIG. 22, where a solid material 35 (e.g., laser sintering or melting metal powder) is disposed at and protrudes from a planar surface of the galvanized metal sheet 12. These protrusions 35 likewise create ventilation openings for zinc oxide fumes generated from welding to escape the interior of the respective tubular portion of the formed beam.

The line of protrusions or dimples 32 are formed at a location on or along the sheet 12 to correspond with the attachment point or weld seam when the sheet 12 is formed to close the corresponding tubular portion of the beam 10. As illustrated at step S1 of FIG. 4A, the laser head station 31 may form dimples 32 at two locations with two separate laser beams 34 or equivalents thereof, where the selected location of each line of dimples 32 corresponds with a later-formed weld joint 36, 38 of the beam 10. These weld joints 36, 38 are formed at or along the dimples 32 to enclose the interior areas of the respective adjacent tubular portions 14, 16 of the beam 10. As further illustrated in FIGS. 5A and 5B, the two lines of dimples 32 are parallel with each other and have the same general interval or spacing between each individual dimple 32 longitudinally along the sheet 12.

Figure 5A:
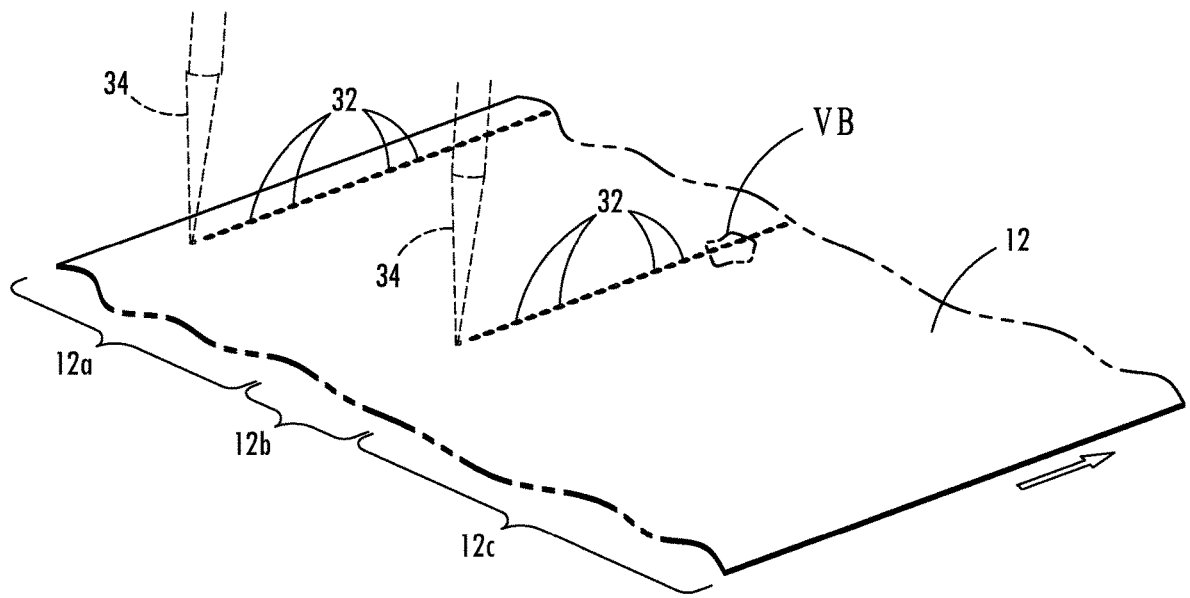
FIG. 5A is a schematic perspective view of a laser station forming dimples over an upper surface of metal sheet stock.
Figure 5B:
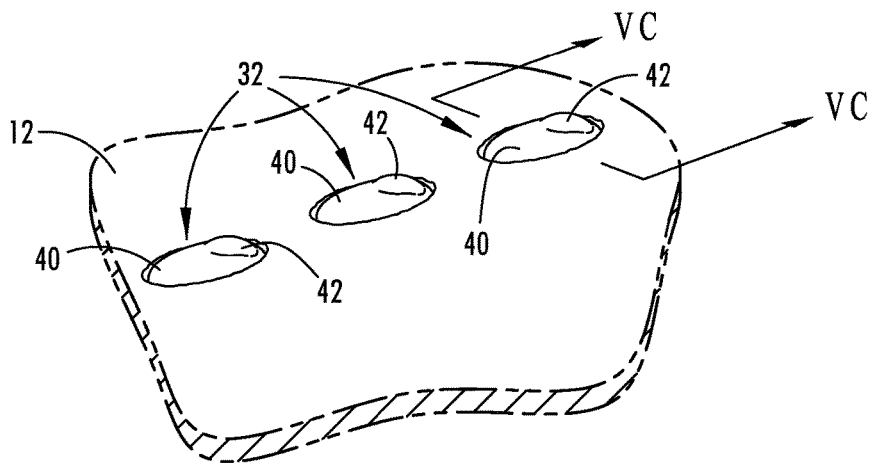
FIG. 5B is an enlarged view of the formed dimples shown at section VB in FIG. 5A.
Figure 5C:
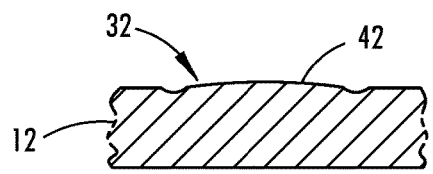
FIG. 5C is a cross-sectional view of a dimple shown along line VC-VC in FIG. 5B.

The dimples 32 may each have a recessed portion 40 and a raised portion 42, which may be formed from a laser pulsing or otherwise intermittently contacting the sheet 12 (i.e. laser dimpling). More specifically, the sheet material, laser intensity, and speed of the sheet 12 moving relative to the laser beam 34 may be calibrated and configured so that the laser beam does not penetrate through the sheet and instead forms the recessed portion 40 at a desired depth and the raised portions 42 at a corresponding desired height, such as shown in FIG. 5B. To do so, a small pool of molten metal may be formed on the upper surface of the sheet 12 by the heat generated from the laser 34 contacting the sheet 12. When the laser 34 stops or no longer contacts the sheet 12 (or otherwise sufficiently reduces intensity), the metal cools and hardens with the raised portion 42 protruding at a height that extends beyond the surrounding upper surface of the metal sheet 12, such as shown in FIG. 5C. The length of each dimple taken longitudinally along the length of the sheet may be approximately between 2 mm and 5 mm. It is also contemplated that the dimples may also or alternatively be formed at the bottom surface of the sheet, such as at a location so as to be disposed at the center section 12b of the metal sheet that contacts the edge portion of the outer section 12a of the sheet 12.

With further reference to FIG. 3, a roll of galvanized sheet stock may be uncoiled in a generally horizontal plane to be processed, such as by being uncoiled at a generally constant rate toward and into a roll former or roll forming apparatus, such as with the laser station 31 initially forming the protrusions or dimples 32 at the upper surface of the sheet 12. The galvanized multi-tubular beam 10 is then formed to its shape by the roll forming apparatus processing the single sheet 12 via a series of paired rolls in roll forming stations, with each station performing a forming operation, such as shown by the roll formed flower pattern of forming steps S2-S28 and S30-S45 shown in FIGS. 4A and 4B. During the roll forming process, the metal sheet 12 is formed to have the adjacent tubular portions 14, 16 formed on opposite sides of the single center wall 18. Again, it is contemplated that the beam formed with the ventilation welding process may have an alternative profile or shape from that shown in FIG. 2, such as a B-shaped beam or a D-shaped beam.

Figure 4A:
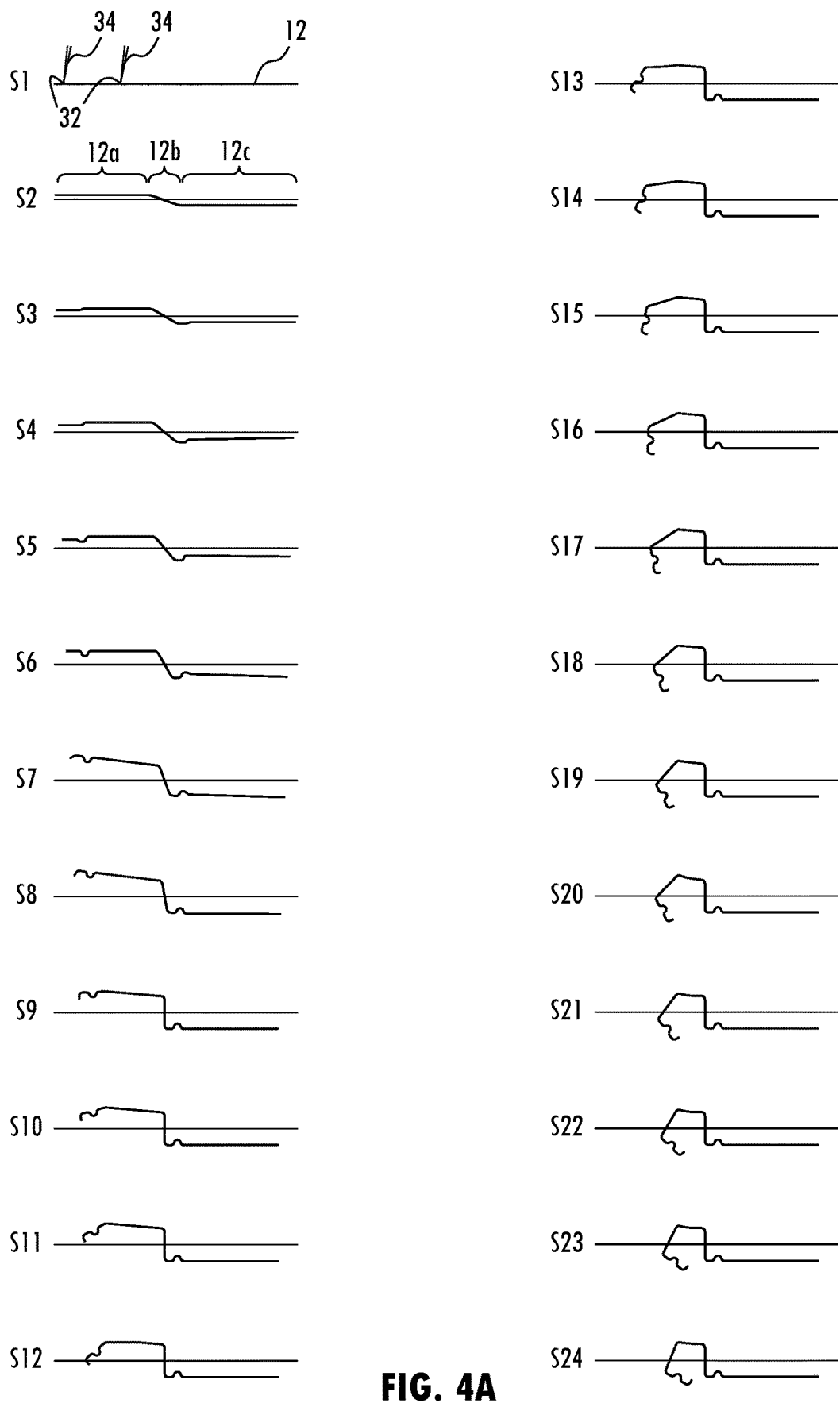
FIG. 4A is a series of cross sections labeled S1-S24, showing a shape of the metal sheet stock at various forming steps when roll forming the beam of FIG. 2.
Figure 4B:
FIG. 4B is a further series of cross sections labeled S25-S46, showing a shape of the metal sheet stock at additional forming steps when roll forming the beam of FIG. 2.
Figure 4B:
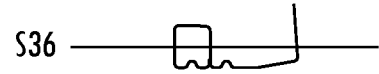
Figure 4B:
Figure 4B:
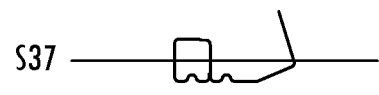
Figure 4B:
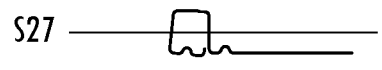
Figure 4B:
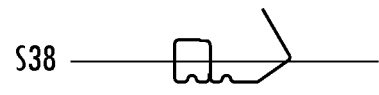
Figure 4B:
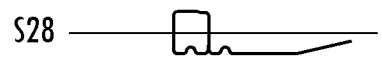
Figure 4B:
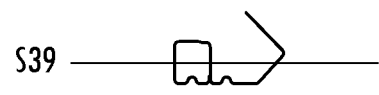
Figure 4B:
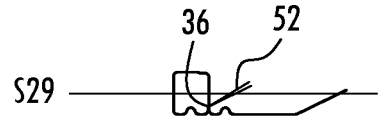
Figure 4B:
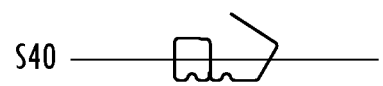
Figure 4B:
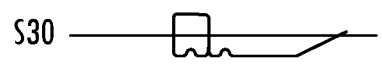
Figure 4B:
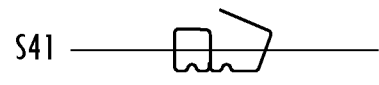
Figure 4B:
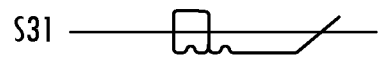
Figure 4B:
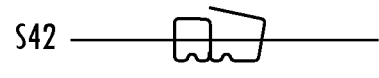
Figure 4B:
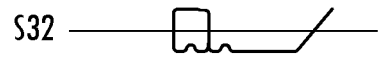
Figure 4B:
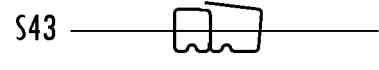
Figure 4B:
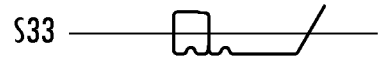
Figure 4B:
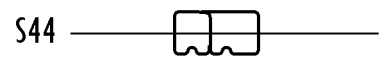
Figure 4B:
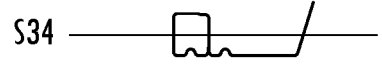
Figure 4B:
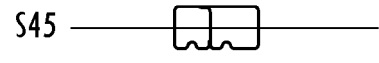
Figure 4B:
Figure 4B:
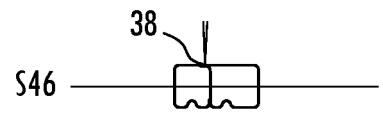
Figure 6A:
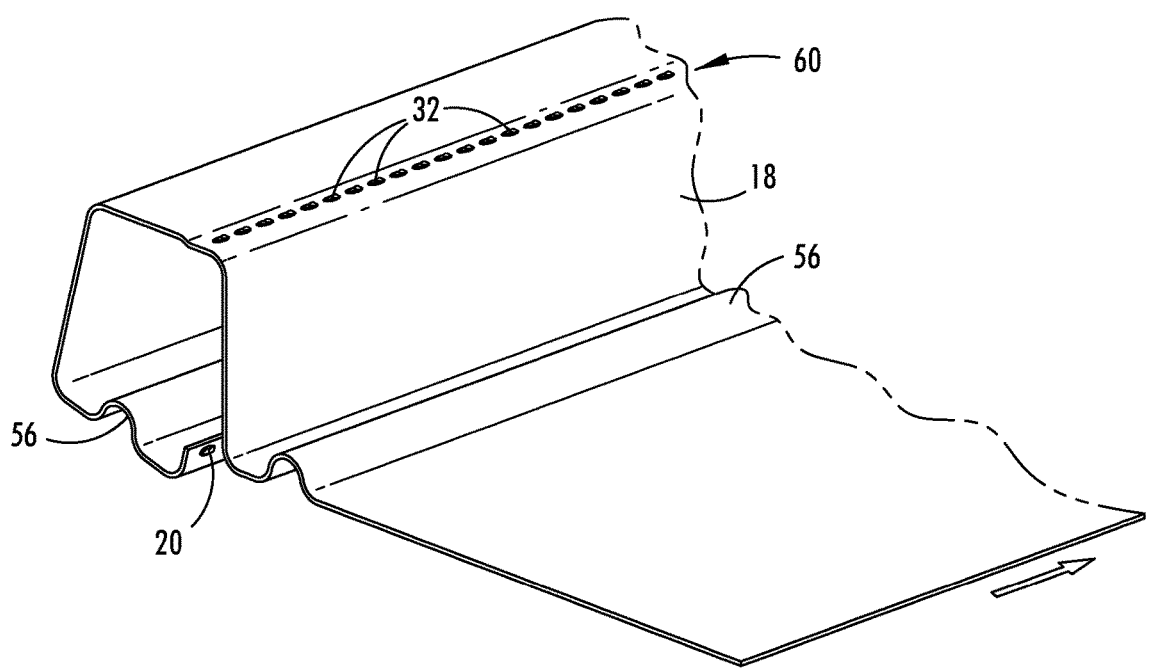
FIG. 6A is a perspective view of a section of the partially formed beam at forming step S25 of FIG. 4B.
Figure 6B:
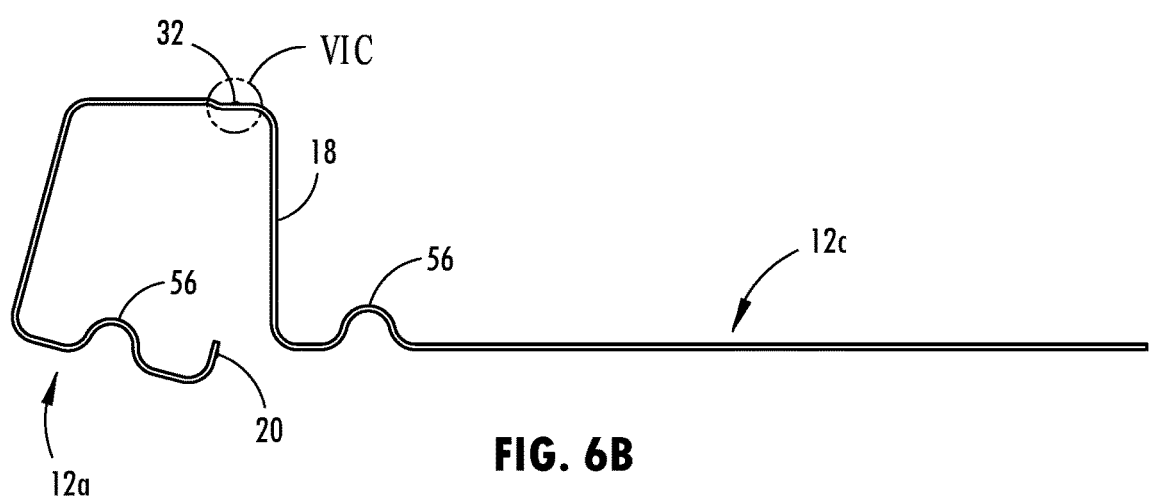
FIG. 6B is a cross-sectional view of the partially formed beam of FIG. 6A.
Figure 6C:
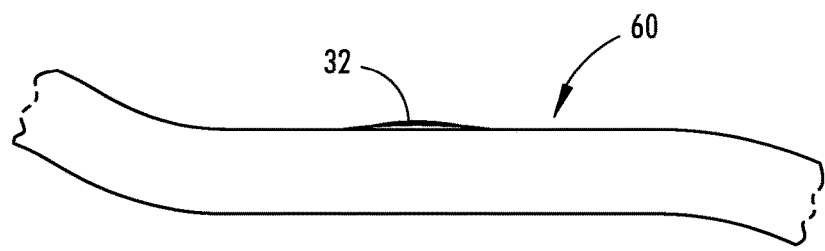
FIG. 6C is an enlarged view of the dimples shown at section VIC in FIG. 6B.

As shown in FIG. 3, the roll former may include a first series 44 of forming rolls in stations that successively bend the outer section 12a of the sheet 12 and the center section 12b of the sheet 12, such as to correspond to forming steps S2-S28 shown in FIGS. 4A and 4B. Thus, the first series 44 of forming rolls successively form the sheet 12 toward and into the shape of the corresponding tubular portion 14 of the beam 10 and orient the center wall 18 of the beam 10 toward and into general perpendicular orientation relative to the other outer section 12c of the sheet 12. In doing so, an edge portion of the outer section 12a of the metal sheet 12 is formed with a radiused end that is configured to contact the center section 12b of the metal sheet 12, such as shown at step S25 illustrated in greater detail in FIGS. 6A and 6B. Accordingly, the first series 44 of forming rolls may deform slightly less than "half" of the width of the sheet in a first direction (illustrated as a counterclockwise direction in FIGS. 4A and 4B) to form a first tube or tubular portion with a radiused edge of the sheet abutted against a radiused end of a center wall. It is conceivable that the first series of forming rolls may include more or fewer stations so as to form the sheet from a flat section to generally provide a tubular portion with a ventilation seam, as disclosed herein ready for welding the galvanized sheet.

Figure 7A:
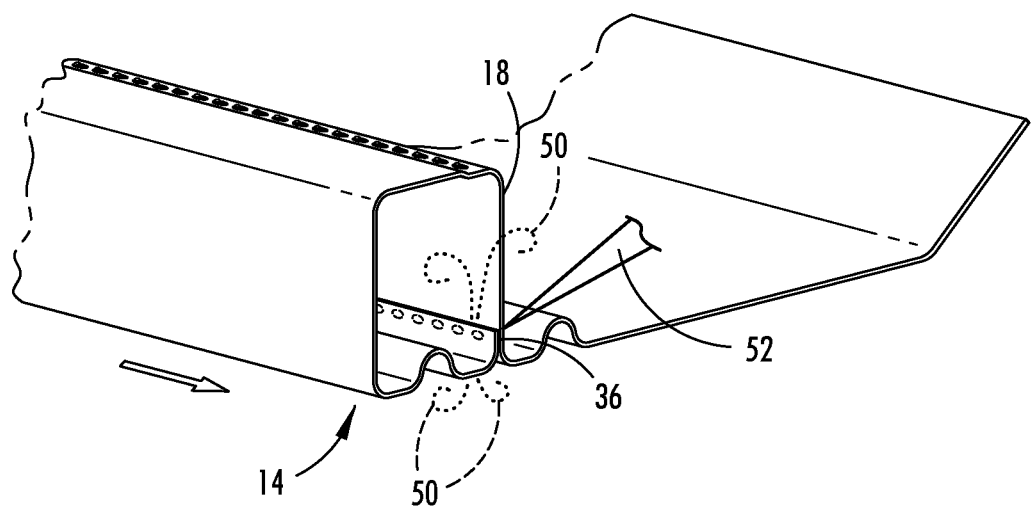
FIG. 7A is a perspective view of a section of the partially formed beam at laser welding step S29 of FIG. 4B.
Figure 7B:
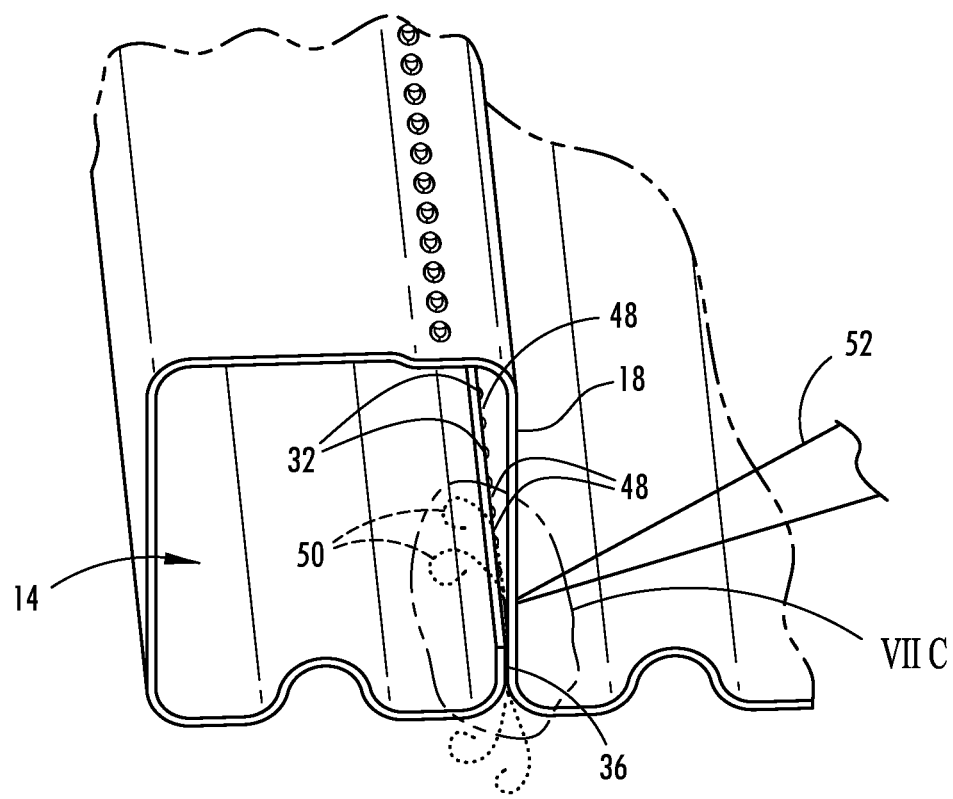
FIG. 7B is another perspective view of the section of the beam shown in FIG. 7A.
Figure 7C:
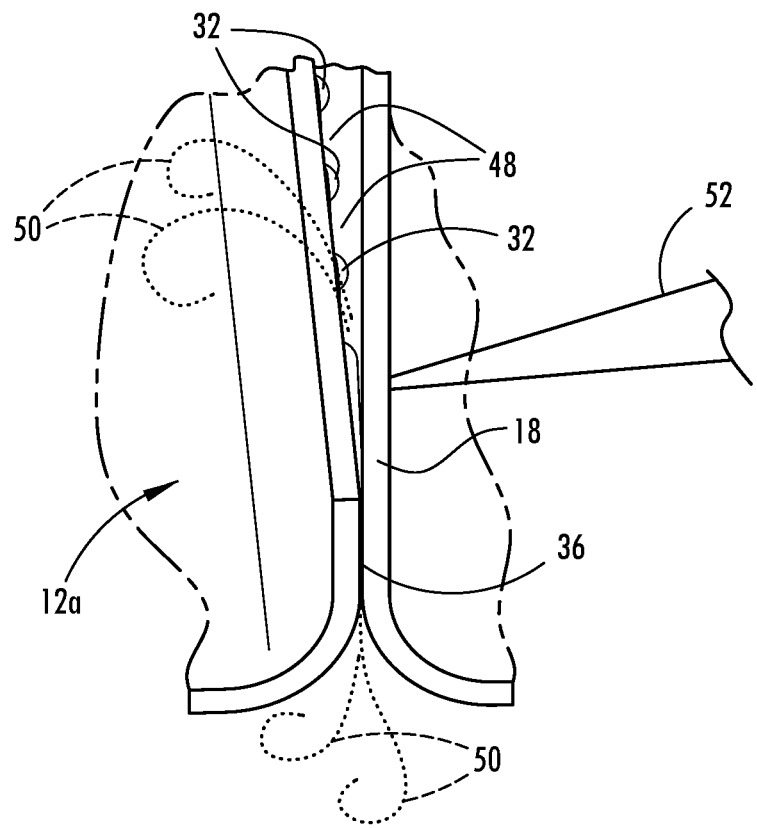
FIG. 7C is an enlarged view of the laser welding shown at section VIIC in FIG. 7B.

Prior to welding at a first laser welding station 46 (FIG. 3), the first series 44 of forming rolls may place the line of protrusions 32 on the outer section 12a of the metal sheet 12 in contact with a generally planar surface of the sheet 12, such as shown in FIG. 7E. The line of contact of the protrusions 32 against the center section 12b of the sheet 12 may be at an end of the center wall 18 where the center wall 18 becomes generally planar or flat. The longitudinal spacing between the protrusions 32 provides the ventilation openings 48 for zinc oxide fumes generated from welding to escape the interior of the respective tubular portion of the beam 10. The separation between the edge portion of the outer section 12a and the center section 12b that is provided by the protrusions 32 is approximately between 50 micrometers and 300 micrometers. As such, the line of protrusions shown in FIG. 7E is an example of a ventilation seam configured for continuously laser welding a galvanized sheet that is continuously roll formed to a tubular-shaped beam. It is beneficial to ventilate the welding of galvanized steel, especially fumes trapped in an enclosed area of a tube, so as to have a consistent weld free of gas openings or pockets that can form with pressured gases, such as zinc oxide gas.

As shown in FIGS. 7A-7F, the weld joint 36 is formed via laser welding along the ventilation seam at the first welding station 46 to form the weld joint 36 that is closed continuously along the length of the beam 10. Due to the protrusions 32 that form the ventilation openings 48, the weld joint 36 has a thickness (of approximately between 50 micrometers and 300 micrometers) that slightly separates a planar surface of the edge portion of the outer section 12a from a planar surface of the center section 12b. When welding the weld joint 36, the longitudinal spacing between the protrusions 32 provides the ventilation openings 48 for zinc oxide fumes 50 generated from the welding to escape the interior of the tubular portion 14 of the beam 10 upstream in the roll former from the welding station 46 (i.e. prior to the ventilation openings 20 being welded closed at the welding station 46).

Figure 7D:
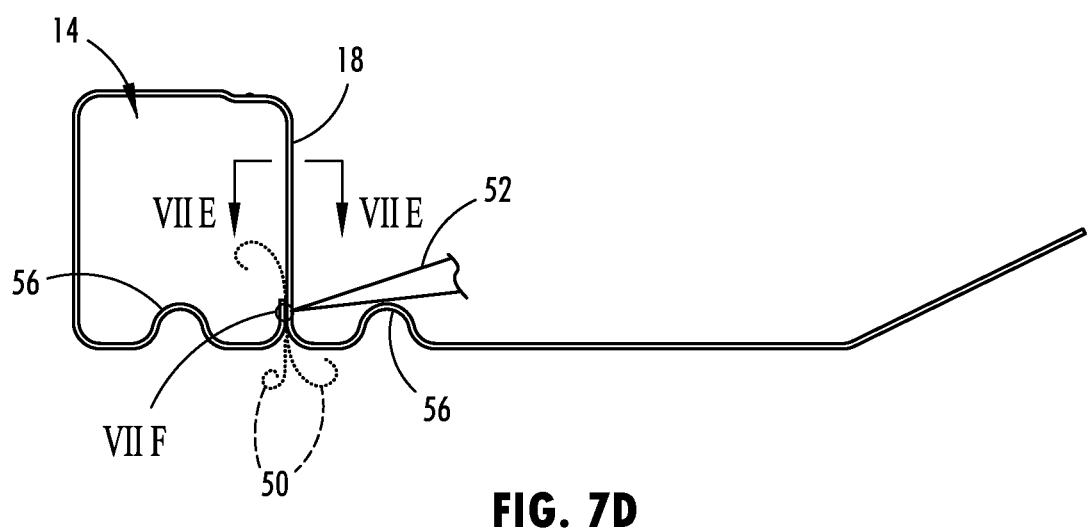
FIG. 7D is a cross-sectional view of the section of the beam shown in FIG. 7A.

As shown at FIG. 7D, the laser beam 52 that is generated by the welding station 46 to form the weld joint 36 is positioned approximately perpendicular to the orientation of the center wall 18. This substantially perpendicular orientation of the laser beam 52 further forms the weld joint 36 with a relatively narrow heat affect zone 54, such as shown in FIG. 7G. The heat affect zone 54 may, for example, be approximately between 1 mm and 2 mm.

Accordingly, when the outer section 12c of the sheet 12 is generally perpendicular to the center wall section 12b, the location of the weld joint 36 is balanced with the presence and depth of a stiffening rib 56 formed in the front wall 22 of the second tubular portion 16 of the beam 10. In an alternative embodiment, as shown in FIG. 2A, a beam 110 is similarly formed, but the outer section 112c of the sheet 112 does not have a stiffening rib, so as to allow for a more perpendicular orientation of a laser welder when welding the weld joint 136 along the length of the beam 110.

Figure 8A:
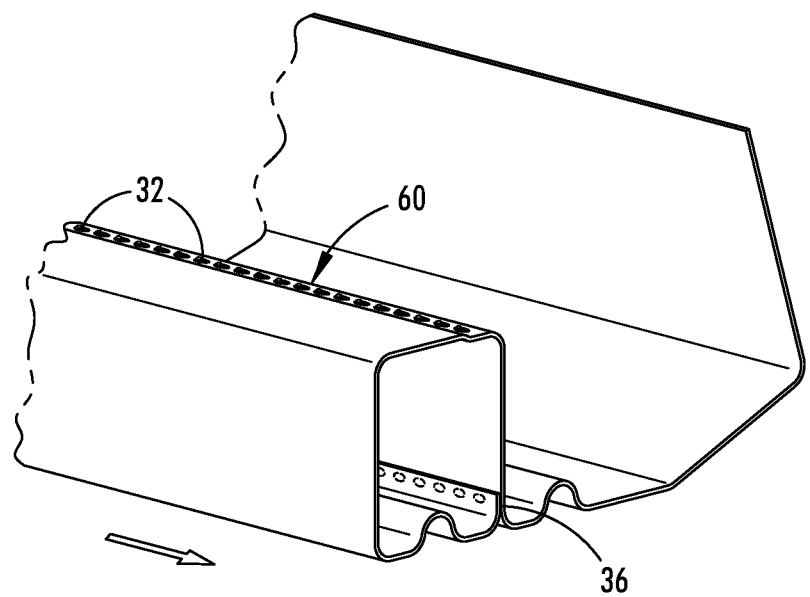
FIG. 8A is a perspective view of a section of the partially formed beam at forming step S37 of FIG. 4B.
Figure 8B:
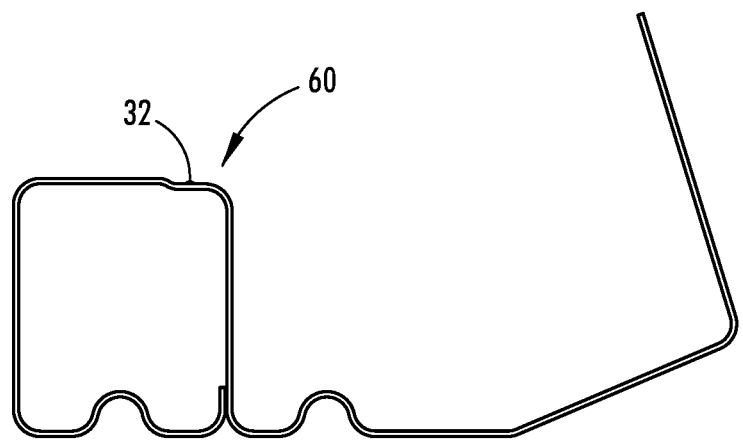
FIG. 8B is a cross-sectional view of the partially formed beam of FIG. 8A.

Referring again to FIG. 4B, after forming the weld joint 36, the sheet 12 continues into a second series 58 of forming rolls in stations that successively bend the remaining outer section 12c of the sheet 12, such as to correspond to forming steps S30-S45. Thus, the second series 58 of forming rolls successively form the sheet 12 toward and into the shape of the corresponding tubular portion 16 of the beam 10, generally completing the shape of the beam 10. In doing so, an edge portion of the outer section 12c of the metal sheet 12 is configured to contact and form a lap joint with the rear wall 24 of the first tubular portion 14 of the beam 10, such as shown at step S37 illustrated in greater detail in FIGS. 8A and 8B. The lap joint includes a thickness that separates a planar surface of the edge portion from a planar surface of the rear wall 24, where the thickness of the weld joint is formed by the protrusions 32 that protrude from the planar surface of the rear wall 24 (and/or the edge portion), such that when welding the lap joint, zinc oxide fumes 50 escape the interior of the respective tubular portion 16 of the beam through vent openings 48 formed by the protrusions 32. The separation between the edge portion of the outer section 12c and the rear wall 24 that is provided by the protrusions 32 is approximately between 50 micrometers and 300 micrometers. Accordingly, the second series 58 of forming rolls may deform the remaining "half" of the width of the sheet in the same rotational direction as the first series of forming rolls (illustrated as a counterclockwise direction in FIGS. 4A and 4B) to form a second tube or tubular portion. It is again conceivable that the second series of forming rolls may include more or fewer stations to generally provide a tubular portion with a ventilation seam, as disclosed herein ready for welding the galvanized sheet.

Figure 9A:
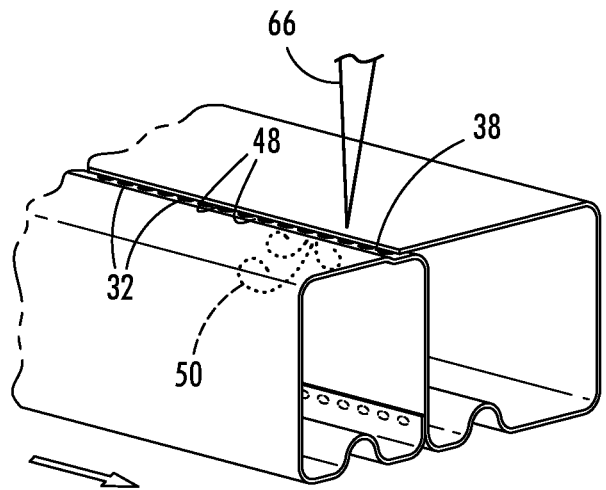
FIG. 9A is a perspective view of a section of the partially formed beam at laser welding step S46 of FIG. 4B.

The second series 58 of forming rolls, such as shown in FIG. 3, may place the end of the outer section 12c of the metal sheet 12 in contact with a recessed area 60 formed along the rear wall 24, as shown in FIG. 9A. The recessed area 60 on the rear wall 24 may provide an area for a second line of protrusions 32. The recessed area 60 allows the rear walls 24, 26 of the beam to be disposed in generally planar alignment with each other. The longitudinal spacing between the protrusions 32 again provides the ventilation openings 48 for zinc oxide fumes generated from welding to escape the interior of the respective tubular portion of the beam 10. As such, the line of protrusions shown in FIG. 9A is another example of a ventilation seam configured for continuously laser welding a galvanized sheet that is continuously roll formed to a tubular-shaped beam.

Figure 9B:
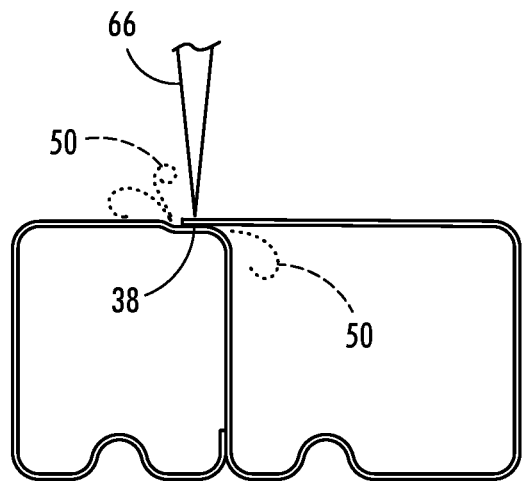
FIG. 9B is a cross-sectional view of the section of the beam shown in FIG. 9A.

As further shown in FIGS. 9A and 9B, the weld joint 38 is formed via laser welding along the ventilation seam at a second welding station 64 (FIG. 3) to form the weld joint 38 that is closed continuously along the length of the beam 10. Due to the protrusions 32 that form the ventilation openings 48, the weld joint 38 has a thickness that slightly separates a planar surface of the edge portion of the outer section 12c from the planar surface of the sheet that it contacts. When welding the weld joint 38, the longitudinal spacing between the protrusions 32 provides the ventilation openings 48 for zinc oxide fumes 50 generated from the welding to escape the interior of the tubular portion 16 of the beam 10 upstream in the roll former from the welding station 64. As shown at FIG. 9B, the laser beam 66 that is generated by the welding station 64 to form the weld joint 38 is positioned approximately perpendicular to the orientation of the rear walls 24, 26. Again, this substantially perpendicular orientation of the laser beam 66 allows the weld joint 38 to be formed with a relatively small heat affect zone.

The roll former may further be configured to form channel or stiffening ribs 56 that protrude into an interior volume of each tubular portion 14, 16, such as shown at the front walls of the beam. The stiffening ribs 56 (i.e. an inwardly formed depression, also sometimes called a "power rib") further stiffens the wall section, and accordingly, in the beam 10 shown in FIG. 2 stiffens the front face of the beam 10 and stiffens the corresponding tube portions 14, 16. The illustrated stiffening ribs 56 have a width diameter about 10%-40% of a width of the corresponding wall section (or more preferably about 20%-30% of the width) and has a depth about equal to its width diameter. The bottoms of the illustrated channel ribs are semicircular shaped. Nonetheless, it is contemplated that a depth and size of the channel ribs can be made shallow, deeper, wider, narrower, flat-bottomed, or otherwise modified to satisfy specific functional requirements of a beam.

The beam 10 is made from a sheet 12 of steel material having a thickness of 0.8 mm to 1.4 mm or approximately between 1 mm and 1.5 mm. Also, the sheet 12 may have a tensile strength of about 800 to 2000 MPa (i.e. about 120 to 290 ksi). The illustrated beam is about 80 mm high and 40 mm deep (in vehicle-mounted position), with two channel ribs being formed in the beam's front face (one over each tube). Each illustrated stiffening rib is about 8 mm to 10 mm deep and 8 mm to 10 mm wide, and includes a rounded bottom. However, it is contemplated that the present beam can be made of different materials, including AHSS (Advanced High Strength Steels) and that it can be made from a sheet having a thickness of about 0.8 mm to 3.0 mm thick (or such as 0.8 mm to 1.4 mm thickness), and can be made in different beam cross-sectional sizes, such as about 80 mm to 150 mm high, and 30 mm to 60 mm deep, and having a length equal to or slightly greater than a distance between vehicle mounts/bumper frame rail tips.

A related apparatus for manufacturing a tubular reinforcement beam 10 on a roll former comprises an in-line sweep station 68 and cutoff 70. The first and second laser welding stations 46, 64 are configured to form welds along the beam that are capable of withstanding longitudinal bending of the beam at the in-line sweep station 68. It is understood that the laser beams of the laser welding stations 46, 64 may be positioned at various orientations relative to the beam as necessary to form the desired weld, such as above, below, or at a side of the beam. It is further noted that the roller former can utilize a roll mill with horizontal axes supporting forming rolls, or alternatively can utilize a roll mill with vertical axes supporting forming rolls.

Figure 10:
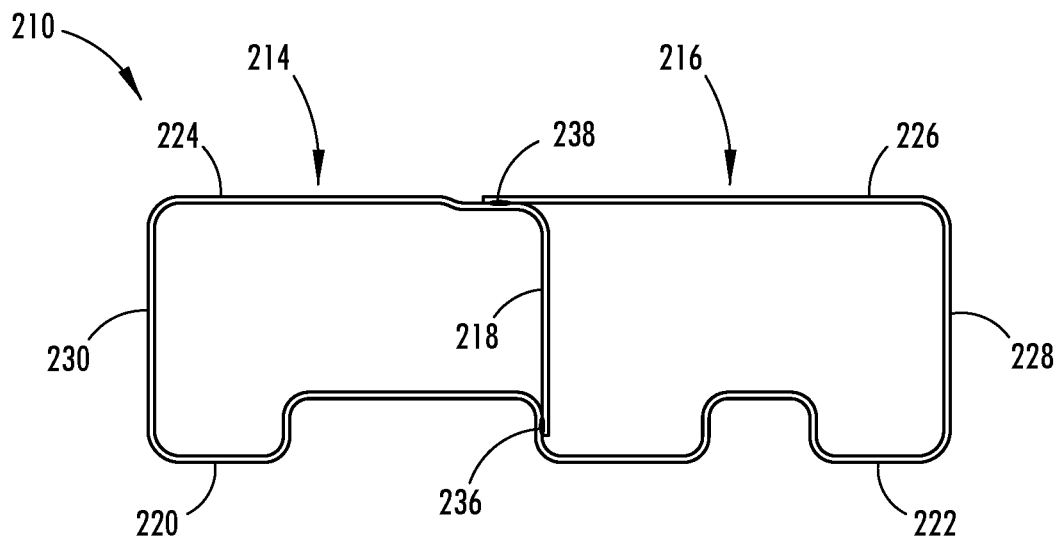
FIG. 10 is a cross-sectional view of an additional reinforcement beam.

Referring now to FIGS. 10-13C, an additional example of a galvanized multi-tubular beam 210 is shown having two adjacent tubular portions 214, 216 that share a common center wall 218 of the beam 210. Different from the beam 10 shown in FIG. 2, an outer section 272 of the metal sheet 212 forms the common center wall 218 of the beam 210, opposed to a center section of the sheet. The center wall 218 of the beam 210 shown in FIG. 10 is formed by an edge portion 272a of the outer section 272 of the metal sheet 212 attaching at an inner landing surface 274 of the beam 210 to enclose one of the tubular portions 214. The other tubular portion 216 is formed by the opposing outer section 276 of the metal sheet being formed in an opposite rotational direction from the first tubular portion 214 so that an edge portion 276a of the outer section 276 of the metal sheet 212 is attached to an opposing end of the center wall 218 with a lap joint 238 similar to that shown at the weld joint 38 of the beam 10 shown in FIG. 2.

Figure 2A:
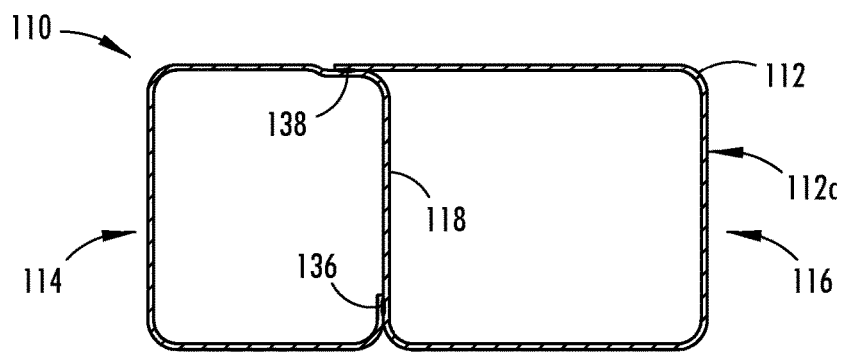
FIG. 2A is a cross-sectional view of an additional reinforcement beam.
Figure 11:
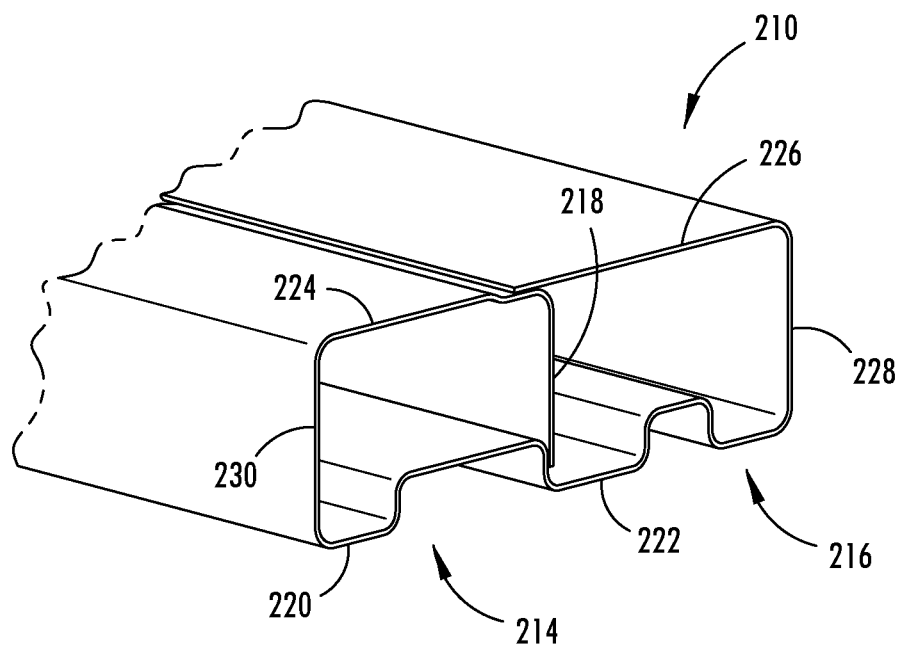
FIG. 11 is a perspective view of an end section of the beam shown in FIG. 10.

The formed beam 210 shown in FIGS. 10 and 11 may be rotated about its longitudinal axis to be oriented similar to the beam 10 shown in FIG. 2, such as for use as a bumper reinforcement beam, whereby the respective walls of the beam 210 may be referenced as front walls 220, 222, rear walls 224, 226, an upper wall 228, and a lower wall 230. The front walls 220, 222 of the adjacent tubular portions 214, 216 are substantially aligned with each other so as to form an outward facing or impact surface of the beam when used as a bumper reinforcement beam. Similarly, the rear walls 224, 226 are in general alignment with each other and are substantially parallel with the front walls 220, 222. Further, the upper and lower walls 228, 230 are substantially parallel with each other and the center wall 218 and generally perpendicular with the front and rear walls 220, 222, 224, 226. It is understood that additional examples of the beam 210 may assume various orientations from that shown in FIGS. 10 and 11 and may include alternative cross-sectional shapes and dimensional proportions, such as for different uses and applications of the beam.

Figure 12A:
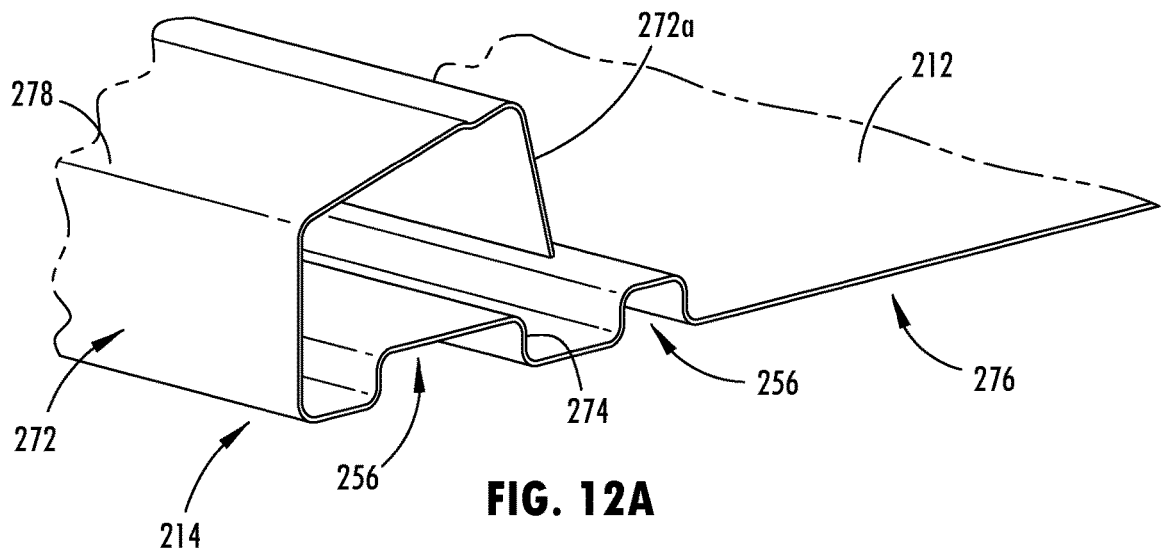
FIG. 12A is a perspective view of a partially formed beam at a stage in forming the reinforcement beam shown in FIG. 10.

Referring now to FIG. 12A, the galvanized sheet stock 212 may be roll formed through a series of roll dies to form a cross-sectional shape, such as the illustrated example, that is achieved prior to closing the seam that is welded to enclose the first tubular portion 214 (FIG. 10). In this illustrated example, the protrusions 232 (FIG. 12B) that are formed at the seam are formed in-line on the roll former after passing through several roll form dies on the roll form line. By roll forming the sheet stock 212 to achieve an intermediate cross-sectional shape of the beam 210 prior to forming protrusions 232, the protrusions can then be formed without a risk of being damaged or flattened from passing through roll form dies prior to being utilized at the weld seam. Specifically, as shown in FIG. 12A, the outer edge portion 272a of the sheet 212 that is used to form the first tubular portion 214 of the beam 210 is spaced upward and away from the desired landing surface 274 of the sheet to allow a laser beam 234 to linearly access the landing surface 274 of the sheet 212 to form protrusions 232 (FIG. 12B).

As further shown in FIG. 12A, the rear corner 278 of the tubular portion 214 on the opposing side of the tubular portion 214 from the landing surface 274 that is used to form the desired weld joint may be used as a single articulation point on the sheet. The sheet may be bent about the rear corner 278 to rotate the edge portion 272a of the sheet down into abutting engagement with the protrusions 232 formed at the landing surface 274, as shown in FIG. 12C. Accordingly, as shown in FIG. 12A, the cross-sectional shape may be formed to have essentially all desired shapes and formations of the first tubular portion 214 made in the outer section 272 of the metal sheet prior to forming the protrusions 232, such that only a final additional bend is needed at the rear corner 278 to close and complete the shape of the first tubular portion 214. It is also contemplated that additional or alternative articulation points may be utilized on another example of the beam from that shown in FIGS. 12A-12C, such as a beam with an alternative cross-sectional shape or roll forming sequence.

Figure 12B:
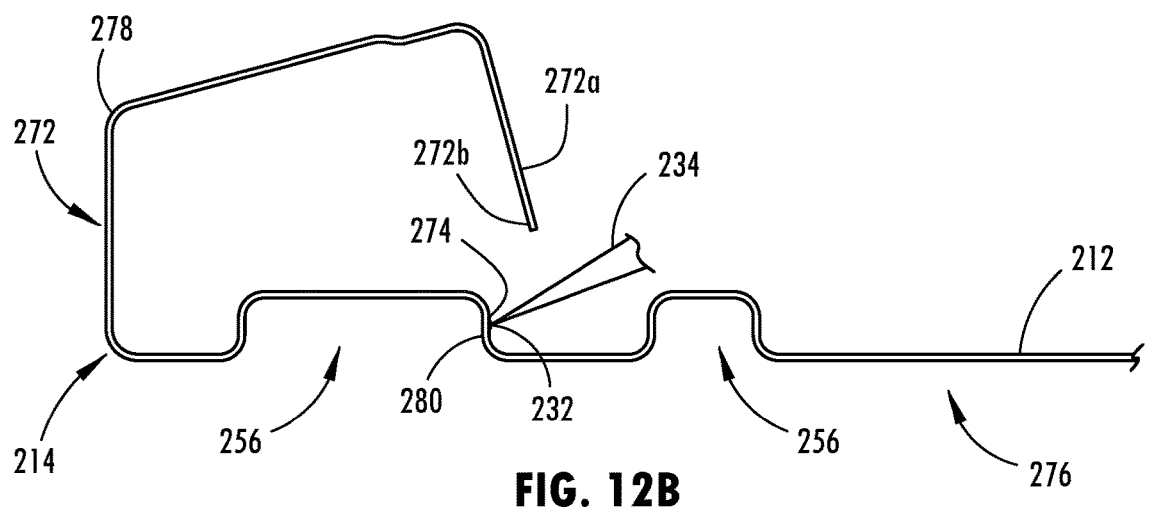
FIG. 12B is a cross-sectional view of the partially formed beam of FIG. 12A at a laser station that is forming dimples over an engagement surface of the metal sheet.
Figure 12C:
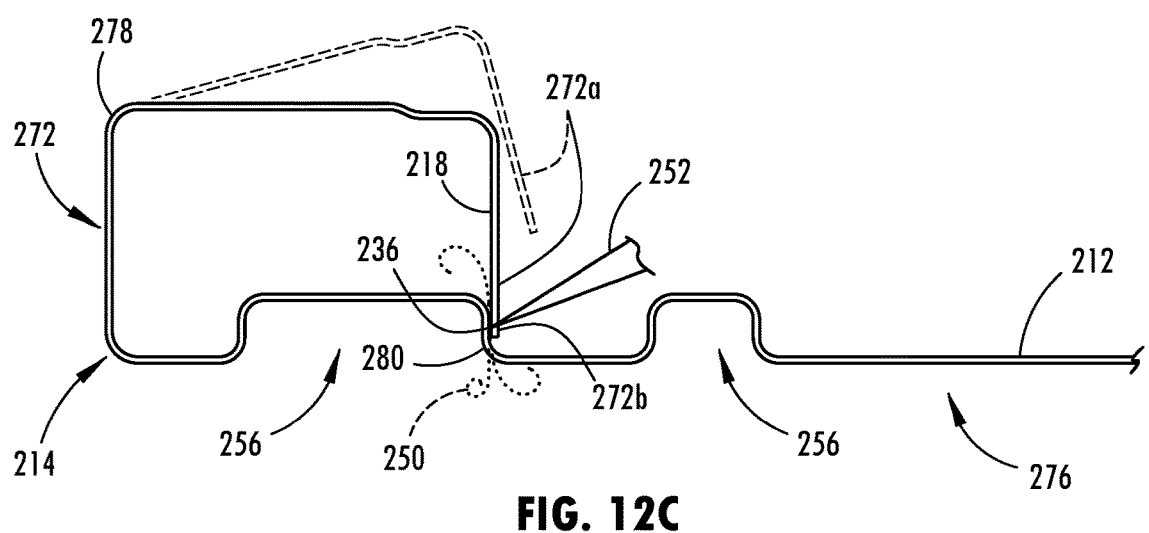
FIG. 12C is a cross-sectional view of the partially formed beam of FIG. 12B at a laser station that is welding an edge of the metal sheet to the engagement surface and enclosing a tubular portion of the reinforcement beam.

The protrusions 232 may be formed at a surface that corresponds with a portion of the sheet 212 that is desired to have a weld joint, such as at the landing surface 274 of the formed metal sheet 212 shown in FIG. 12B. The protrusions 232 may be formed when the metal sheet continuously passes through a laser head station that is arranged in-line on the roll former, between roll form dies. The protrusions 232 formed in-line on the roll former may be disposed at generally consistent intervals linearly along a longitudinal extent of the sheet 212 and may otherwise be formed in the same or similar manner to those shown in FIGS. 5A-5C and described above.

To form the protrusions 232, the laser beam 234 may be angled at a nearly perpendicular orientation relative to the landing surface 274. As shown in FIG. 12B, the landing surface 274 is disposed at a side portion of a stiffening rib 256 that is formed in the front wall 220 of the beam 210. The stiffening ribs 256 protrude into an interior volume of each tubular portion 214, 216 so as to stiffen the wall section of the beam 210. Again, it is contemplated that a depth and size of the stiffening ribs can be altered from that illustrated in FIGS. 10-13C, such as to make the ribs shallower, deeper, wider, narrower, or otherwise modified to satisfy specific functional requirements of the beam. Accordingly, the other stiffening rib 256 that is formed in outer section 276 of the metal sheet 212 used to form the second tubular portion 216 of the beam 10 (FIGS. 10-11) may have a depth that is configured to allow for the generally perpendicular orientation of the laser beams 234, 252 when forming the protrusions 232 and to corresponding weld joint 236.

Prior to welding the seam of the first tubular portion 214 of the beam 210, one or more forming rolls may further form the outer section 272 of the metal sheet 212 to bend and rotate the edge portion 272a about the rear corner 278 and place the outer edge 272a in contact with the line of protrusions 232 on the landing surface 274 of the stiffening rib 256, as shown in FIG. 12C. The line of contact of the protrusions 232 against the edge portion 272a of the metal sheet 212 provides longitudinal spacing between the protrusions 232 that create ventilation openings for zinc oxide fumes generated from welding to escape the interior of the respective tubular portion 214 of the beam 210. The separation between the planar portions of the sheet created by the protrusions 232 is approximately between 50 micrometers and 300 micrometers. The protrusions 232, thus, form a ventilation seam configured for continuously laser welding the galvanized sheet that is continuously roll formed to a tubular-shaped beam 210. The ventilation openings allow fumes that would otherwise be trapped in an enclosed area of a tube to freely escape, so as to have a consistent weld that is free of gas openings or pockets that can form with pressured gases, such as zinc oxide gas.

With the outer portion 272a near or in engagement with the landing surface 274, the metal sheet 212 may enter a welding station that may use external mandrels to hold the shape of cross-section for welding, but otherwise be free of internal mandrels due to the cross-sectional shape of the first tubular portion 214. The external mandrels may apply force to the walls surrounding the first tubular portion 214 generally without disturbing the contact between the protrusions 232 and the landing surface 274 and the generally perpendicular orientation of the center wall 218 relative the front and rear walls 220, 224 of the first tubular portion 214. Specifically, opposing mandrels that apply force to the front and rear walls 220, 224 do not disturb the orthogonal shape of the tubular portion 214 due to the distal end 272b of the edge portion 272a being positioned at the start of a curved formation 280 on the stiffening rib 256 that transitions back to the front wall 220, whereby the external mandrels in combination with the curved formation 280 prevents movement of the distal end 272b that would cause shearing forces at the weld joint 236. The resulting reduction or illumination of internal mandrels in the roll former can assist to reduce friction at the surface of the metal sheet, which can undesirably cause the galvanized coating the wear off.

As shown in FIG. 12C, the weld joint 236 is formed via laser welding along the ventilation seam so as to provide a seam that is attached and closed continuously along the length of the beam 210. Due to the protrusions 232 that form the ventilation openings, the weld joint 236 may have a thickness, such as approximately between 50 micrometers and 300 micrometers, which slightly separates a planar surface of the edge portion 272a of the outer section 272 from a planar surface of the landing surface 274. When welding the weld joint 236, the longitudinal spacing between the protrusions 232 provides the ventilation openings for zinc oxide fumes 250 generated from the welding to escape the interior of the tubular portion 214 of the beam 210 upstream in the roll former from the welding station. As shown at FIG. 12C, the laser beam 252 that is generated by the welding station to form the weld joint 236 is positioned approximately perpendicular to the orientation of the center wall 218. This substantially perpendicular orientation of the laser beam 252 further forms the weld joint 236 with a relatively narrow heat affect zone, such as approximately between 1 mm and 2 mm as shown in FIG. 7G.

Figure 13A:
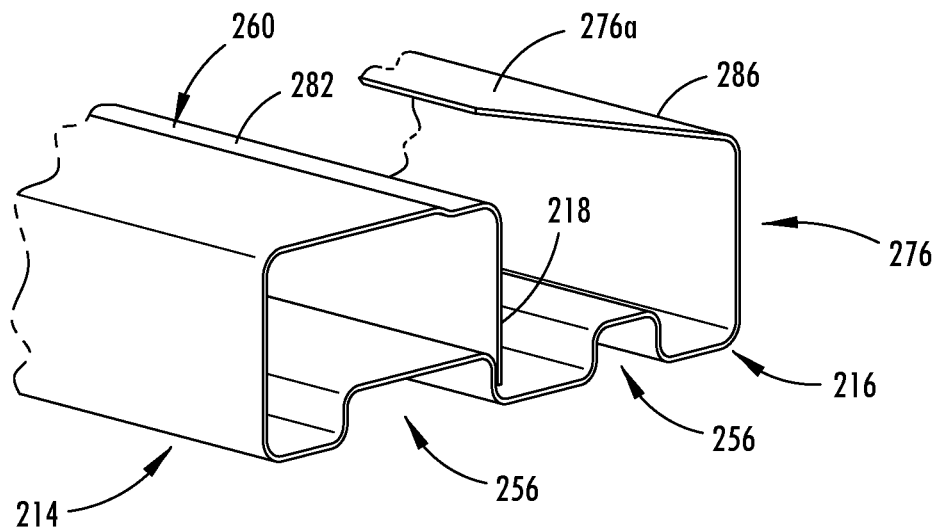
FIG. 13A is a perspective view of the partially formed beam of FIG. 12C with the metal sheet further formed toward the shape of the reinforcement beam shown in FIG. 10.

After forming the weld joint 236, the sheet 212 continues into a second series of forming rolls in stations that successively bend the other outer section 276 of the sheet 212 toward the shape of the second tubular portion 216 of the beam 210. As shown in FIG. 13A, the cross-sectional shape is again formed near, but prior to closing a seam of a tubular portion of the beam 210. At the intermediate cross-sectional shape shown in FIGS. 13A and 13B, the protrusions 232 are again formed at the seam in-line on the roll former so as to reduce risk of damaging or flattening the protrusions. Specifically, as shown in FIG. 13A, the outer edge portion 276a of the sheet 212 that is used to form the second tubular portion 216 of the beam 210 is spaced upward and away from the desired landing surface 282 of the sheet to allow a laser beam 284 to linearly access the landing surface 282 of the sheet 212 to form protrusions 232. The example shown in FIGS. 10-13C shows the landing surface 282 used to form the laser welded lap joint 238 at a recessed area 260 formed along the rear wall 224 at a corner of the first tubular portion 214 adjacent to the center wall 218.

As further shown in FIG. 13A, the rear corner 286 of the second tubular portion 216 on the opposing side of the tubular portion 216 from the weld joint 236 may be used as a single articulation point on the sheet. The sheet may be bent about the rear corner 286 to rotate the edge portion 276a of the sheet down into abutting engagement with the protrusions 232 formed at the landing surface 282, as shown in FIG. 13C. Accordingly, as shown in FIG. 13A, the cross-sectional shape may be formed to have essentially all desired shapes and formations of the second tubular portion 216 made in the outer section 276 of the metal sheet prior to forming the protrusions 232 on the landing surface 282, such that only a final additional bend is needed at the rear corner 286 to close and complete the shape of the second tubular portion 216. It is also contemplated that additional or alternative articulation points may be utilized on another example of the beam from that shown in FIGS. 13A-13C, such as a beam with an alternative cross-sectional shape or roll forming sequence.

Figure 13B:
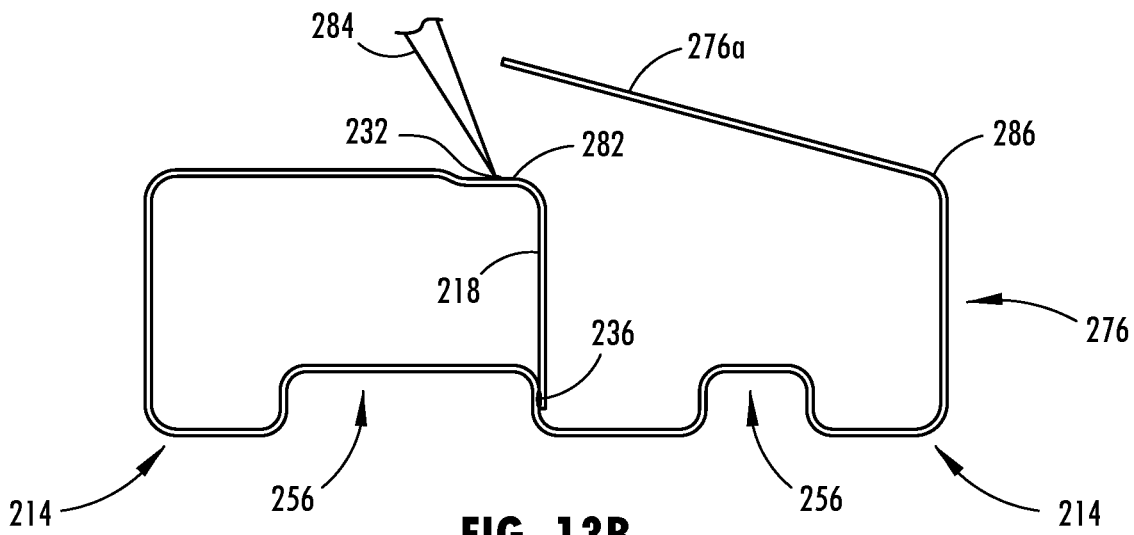
FIG. 13B is a cross-sectional view of the partially formed beam of FIG. 13A at a laser station that is forming dimples over another engagement surface of the metal sheet.
Figure 13C:
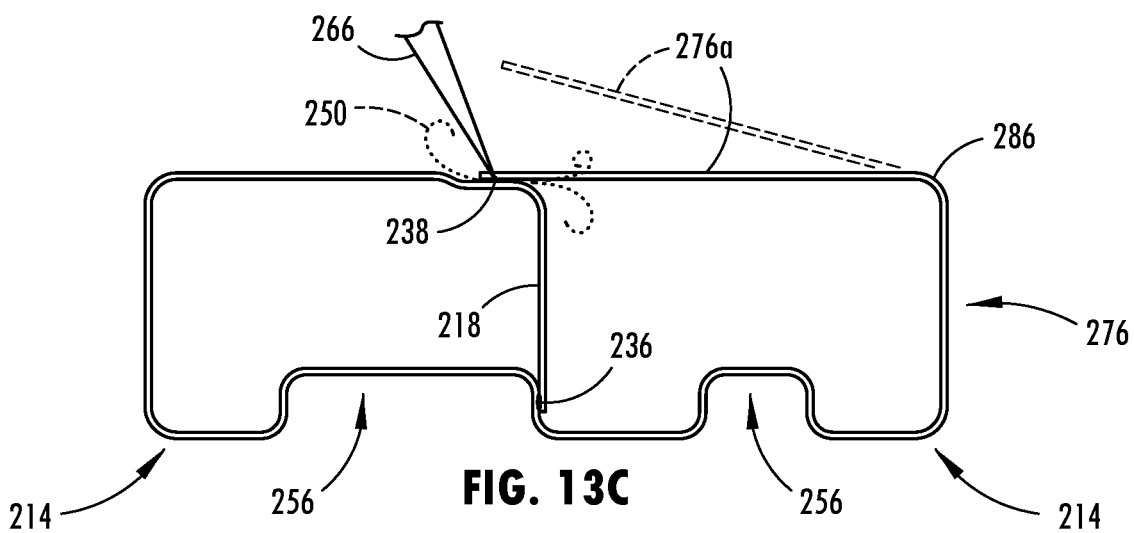
FIG. 13C is a cross-sectional view of the formed reinforcement beam of FIG. 10 at a laser station that is welding an edge of the metal sheet to the engagement surface and enclosing a second tubular portion of the reinforcement beam.

As shown in FIG. 13B, the protrusions 232 may be formed when the metal sheet continuously passes through a laser head station that is arranged in-line on the roll former, between roll form dies. The protrusions 232 shown in FIG. 13B may again otherwise be formed in the same or similar manner to those shown in FIGS. 5A-5C and described above. To form the protrusions 232, the laser beam 284 may be angled at a nearly perpendicular orientation relative to the landing surface 282. Similarly, the laser beam 266 used when forming the corresponding weld joint 236 may be substantially perpendicular to the landing surface 282.

Prior to welding the seam of the second tubular portion 216 of the beam 210, one or more forming rolls may further form the outer section 276 of the metal sheet 212 to bend and rotate the edge portion 276a about the rear corner 286 and place the outer edge 276a in contact with the line of protrusions 232 on the landing surface 282 in the recessed area 260, as shown in FIG. 13C. The recessed area 260 allows the rear walls 224, 226 of the beam 210 to be disposed in generally planar alignment with each other. The line of contact of the protrusions 232 against the edge portion 276a of the metal sheet 212 provides longitudinal spacing between the protrusions 232 that create ventilation openings for zinc oxide fumes generated from welding to escape the interior of the respective tubular portion 216 of the beam 210. The separation between the planar portions of the sheet created by the protrusions 232 is approximately between 50 micrometers and 300 micrometers. The protrusions 232, thus, form a ventilation seam configured for continuously laser welding the galvanized sheet that is continuously roll formed to a tubular-shaped beam 210. The ventilation openings allow fumes that would otherwise be trapped in an enclosed area of a tube to freely escape, so as to have a consistent weld that is free of gas openings or pockets that can form with pressured gases, such as zinc oxide gas.

With the outer portion 276a near or in engagement with the landing surface 282, the metal sheet 212 may enter a welding station that may use external mandrels to hold the shape of cross-section for welding with a laser beam 266, but otherwise be free of internal mandrels due to the position of the weld joint at a lap joint unaffected by external mandrel forces applied around the beam 212. As shown in FIG. 13C, the laser welded lap joint 238 includes a thickness that separates a planar surface of the edge portion from a planar surface of the rear wall 224, where the thickness of the weld joint 238 is formed by the protrusions 232 that protrude from the planar surface of the rear wall 224 (and/or the edge portion), such that when welding the lap joint, zinc oxide fumes 250 escape the interior of the respective tubular portion 216 of the beam through vent openings formed by the protrusions 232. Accordingly, to form a second tubular portion 216, the forming rolls may deform the remaining section 276, such as slightly less than "half" of the width of the sheet, in the opposite rotational direction from the forming rolls that formed the first tubular portion 214.

The beam 210 is made from a sheet 212 of steel material having a thickness of 0.8 mm to 1.4 mm or approximately between 1 mm and 1.5 mm. Also, the sheet 212 may have a tensile strength of about 800 to 2000 MPa (i.e. about 120 to 290 ksi). However, it is contemplated that the present beam can be made of different materials, including AHSS (Advanced High Strength Steels) and that it can be made from a sheet having a thickness of about 0.8 mm to 3.0 mm thick (or such as 0.8 mm to 1.4 mm thickness), and can be made in different beam cross-sectional sizes, such as about 80 mm to 150 mm high, and 30 mm to 60 mm deep, and having a variable sized length for the desired application.

Figure 14:
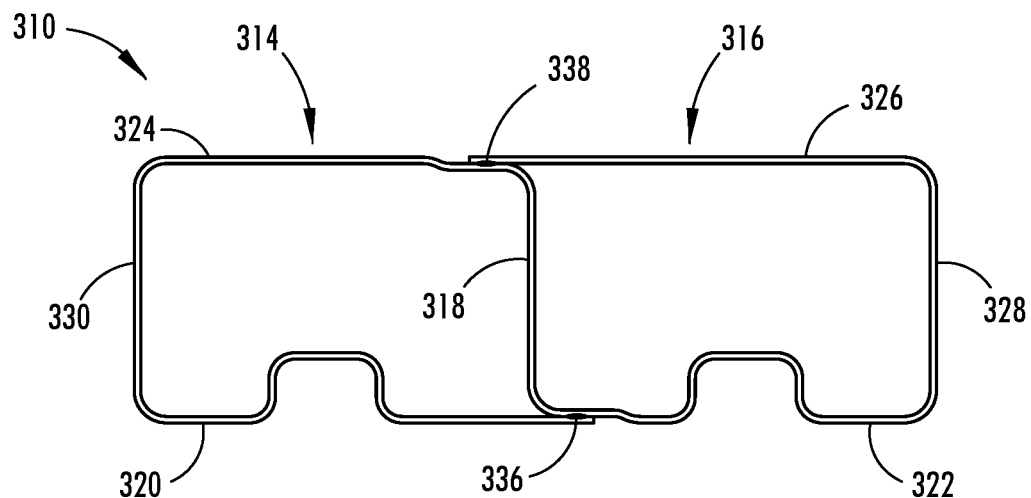
FIG. 14 is a cross-sectional view of an additional reinforcement beam.

Referring now to FIGS. 14-17C, an additional example of a galvanized multi-tubular beam 310 is shown having two adjacent tubular portions 314, 316 that share a common center wall 318 of the beam 310. Different from the beam 10 shown in FIG. 2, both weld joints 336, 338 are formed as lap joints. The laser welded lap joints 336, 338 of the beam 310 shown in FIG. 14 are formed in recessed areas to allow the respective front walls 320, 322 and rear walls 324, 326 of the beam 310 to be disposed in generally planar alignment with each other, similar to that shown at the weld joint 38 of the beam 10 shown in FIG. 2.

Figure 15:
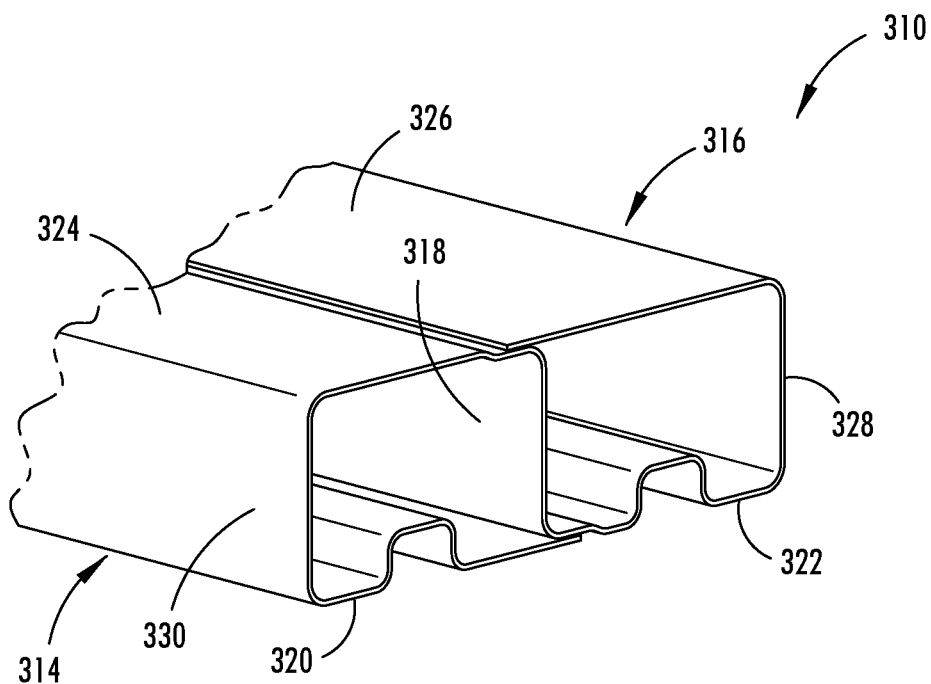
FIG. 15 is a perspective view of an end section of the beam shown in FIG. 14.

The formed beam 310 shown in FIGS. 14 and 15 may be rotated about its longitudinal axis to be oriented similar to the beam 10 shown in FIG. 2, such as for use as a bumper reinforcement beam, whereby the respective walls of the beam 310 may be referenced as front walls 320, 322, rear walls 324, 326, an upper wall 328, and a lower wall 330. The front walls 320, 322 of the adjacent tubular portions 314, 316 are substantially aligned with each other so as to form an outward facing or impact surface of the beam when used as a bumper reinforcement beam. Similarly, the rear walls 324, 326 are in general alignment with each other and are substantially parallel with the front walls 320, 322. Further, the upper and lower walls 328, 330 are substantially parallel with each other and the center wall 318 and generally perpendicular with the front and rear walls 320, 322, 324, 326. It is understood that additional examples of the beam 310 may assume various orientations from that shown in FIGS. 14 and 15 and may include alternative cross-sectional shapes and dimensional proportions, such as for different uses and applications of the beam.

Figure 16A:
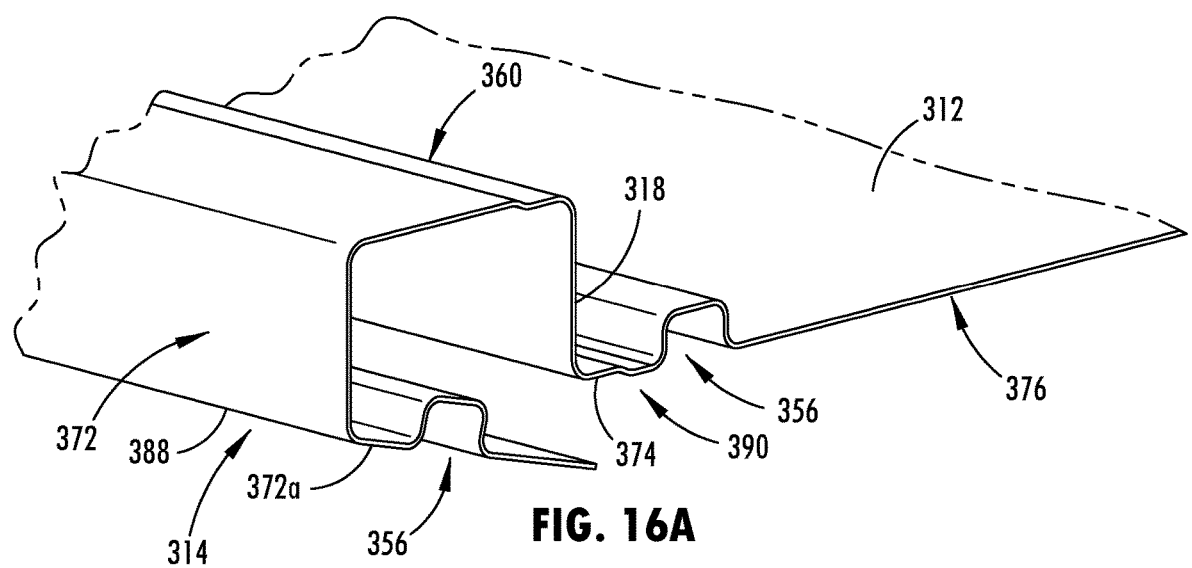
FIG. 16A is a perspective view of a partially formed beam at a stage in forming the reinforcement beam shown in FIG. 14.

Referring now to FIG. 16A, the galvanized sheet stock 312 may be roll formed through a series of roll dies to form a cross-sectional shape, such as the illustrated example, that is achieved prior to closing the seam that is welded to enclose the first tubular portion 314 (FIG. 14). In this illustrated example, the protrusions 332 (FIG. 16B) that are formed at the seam are formed in-line on the roll former after passing through several roll form dies on the roll form line. By roll forming the sheet stock 312 to achieve an intermediate cross-sectional shape of the beam 310 prior to forming protrusions 332, the protrusions can then be formed without a risk of being damaged or flattened from passing through roll form dies prior to being utilized at the weld seam. Specifically, as shown in FIG. 16A, the outer edge portion 372a of the sheet 312 that is used to form the first tubular portion 314 of the beam 310 is spaced downward and away from the desired landing surface 374 of the sheet to allow a laser beam 334 to linearly access the landing surface 374 of the sheet 312 to form protrusions 332 (FIG. 16B).

As further shown in FIG. 16A, the front corner 388 of the tubular portion 314 may be used as a single articulation point on the sheet after the protrusions 332 are formed. The sheet may be bent about the front corner 388 to rotate the edge portion 372a of the sheet up into abutting engagement with the protrusions 332 formed at the landing surface 374, as shown in FIG. 16C. Accordingly, as shown in FIG. 16A, the cross-sectional shape may be formed to have essentially all desired shapes and formations of the first tubular portion 314 made in the outer section 372 of the metal sheet prior to forming the protrusions 332, such that only a final additional bend is needed at the front corner 388 to close and complete the shape of the first tubular portion 314. It is also contemplated that additional or alternative articulation points may be utilized on another example of the beam from that shown in FIGS. 16A-16C, such as a beam with an alternative cross-sectional shape or roll forming sequence.

Figure 16B:
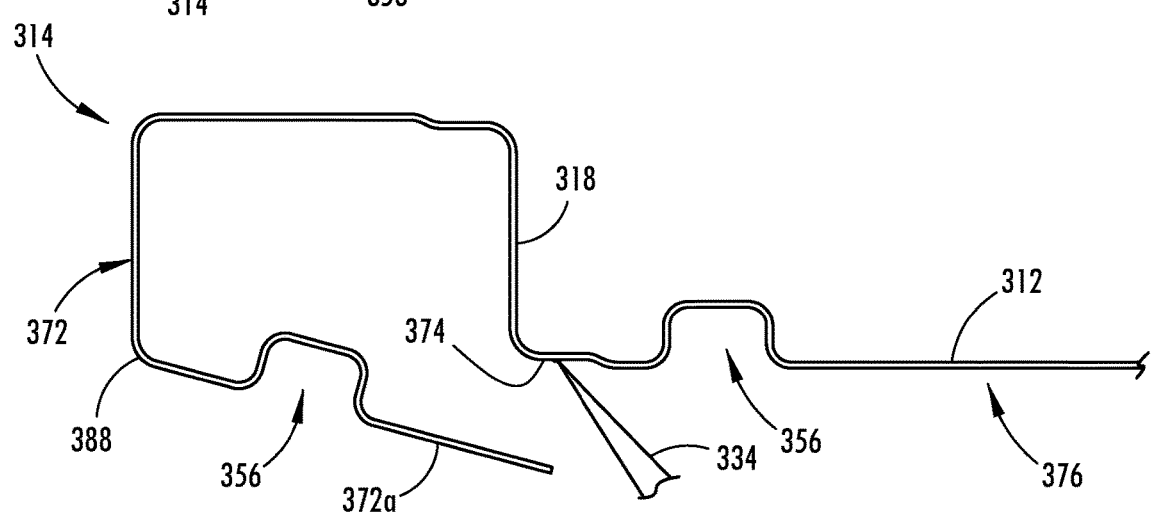
FIG. 16B is a cross-sectional view of the partially formed beam of FIG. 16A at a laser station that is forming dimples over an engagement surface of the metal sheet.
Figure 16C:
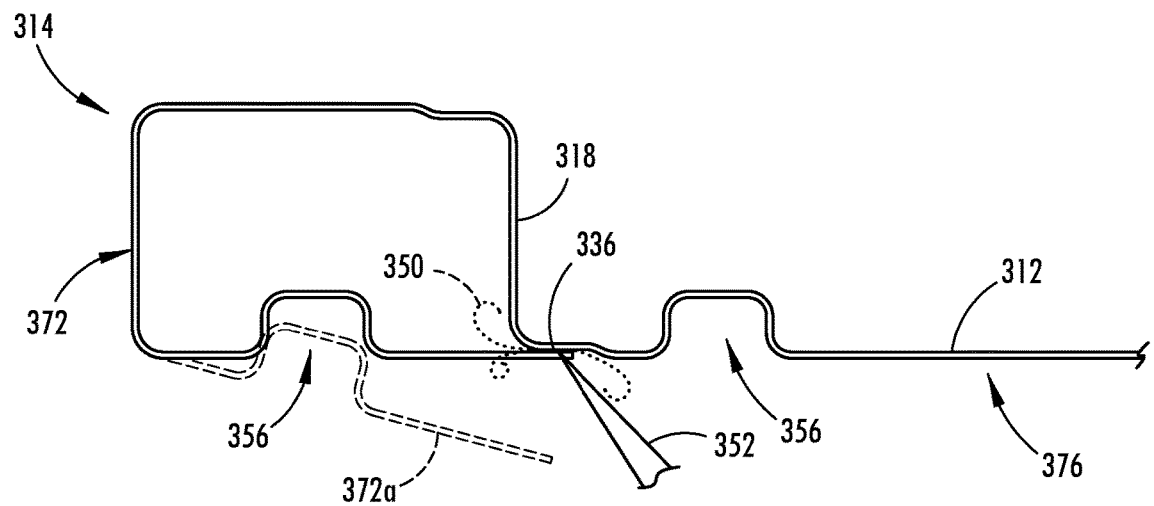
FIG. 16C is a cross-sectional view of the partially formed beam of FIG. 16B at a laser station that is welding an edge of the metal sheet to the engagement surface and enclosing a tubular portion of the reinforcement beam.

The protrusions 332 may be formed at a surface that corresponds with a portion of the sheet 312 that is desired to have a weld joint, such as at the landing surface 374 of the formed metal sheet 312 shown in FIG. 16B. The landing surface 374 used to form the laser welded lap joint 336 is deposed at a recessed area 390 formed along the front wall 322 at a corner of the second tubular portion 316 adjacent to the center wall 318. The protrusions 332 may be formed when the metal sheet continuously passes through a laser head station that is arranged in-line on the roll former, between roll form dies. To form the protrusions 332, the laser beam 334 may be angled at a nearly perpendicular orientation relative to the landing surface 374. The protrusions 332 formed in-line on the roll former may be disposed at generally consistent intervals linearly along a longitudinal extent of the sheet 312 and may otherwise be formed in the same or similar manner to those shown in FIGS. 5A-5C and described above.

Prior to welding the seam of the first tubular portion 314 of the beam 310, one or more forming rolls may further form the outer section 372 of the metal sheet 312 to bend and rotate the edge portion 372a about the front corner 388 and place the outer edge 372a in contact with the line of protrusions 332 on the landing surface 374, as shown in FIG. 16C. The line of contact of the protrusions 332 against the edge portion 372a of the metal sheet 312 provides longitudinal spacing between the protrusions 332 that create ventilation openings for zinc oxide fumes 350 generated from welding to escape the interior of the respective tubular portion 314 of the beam 310 (FIG. 16C). The separation between the planar portions of the sheet created by the protrusions 332 is approximately between 50 micrometers and 300 micrometers.

With the outer portion 372a near or in engagement with the landing surface 374, the metal sheet 312 may enter a welding station that may use external mandrels to hold the shape of cross-section for welding, but otherwise be free of internal mandrels due to the cross-sectional shape of the first tubular portion 314. As shown in FIG. 16C, the weld joint 336 is formed via laser welding along the ventilation seam so as to provide a seam that is attached and closed continuously along the length of the beam 310. Due to the protrusions 332 that form the ventilation openings, the weld joint 336 may have a thickness, such as approximately between 50 micrometers and 300 micrometers, which slightly separates a planar surface of the edge portion 372a of the outer section 372 from a planar surface of the landing surface 374. When welding the weld joint 336, the longitudinal spacing between the protrusions 332 provides the ventilation openings for zinc oxide fumes 350 generated from the welding to escape the interior of the tubular portion 314 of the beam 310 upstream in the roll former from the welding station. As shown at FIG. 16C, the laser beam 352 that is generated by the welding station to form the weld joint 336 is positioned approximately perpendicular to the orientation of the center wall 318. This substantially perpendicular orientation of the laser beam 352 further forms the weld joint 336 with a relatively narrow heat affect zone, such as approximately between 1 mm and 2 mm as shown in FIG. 7G.

Figure 17A:
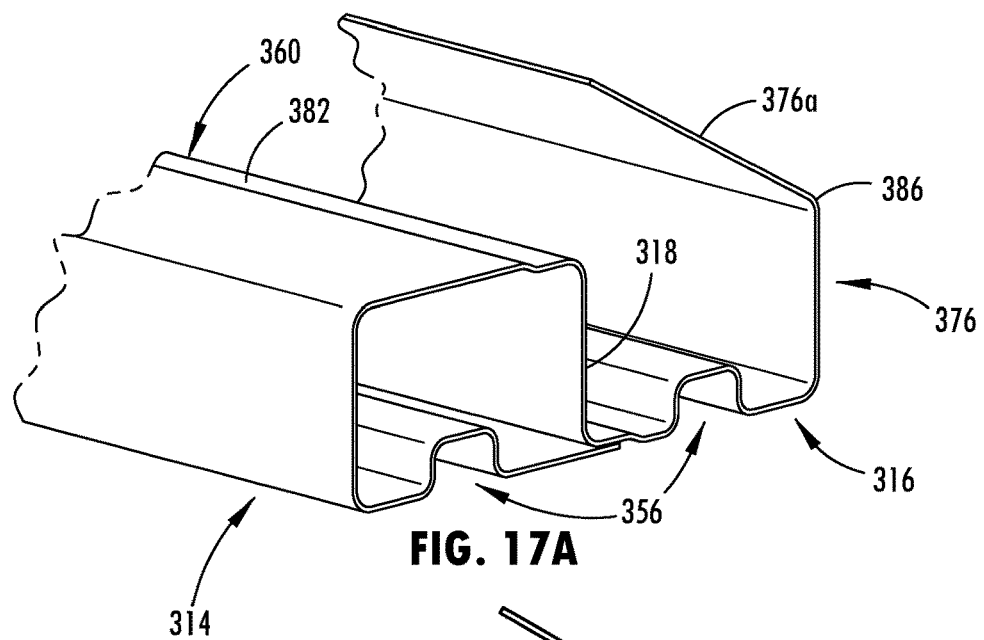
FIG. 17A is a perspective view of the partially formed beam of FIG. 16C with the metal sheet further formed toward the shape of the reinforcement beam shown in FIG. 14.

After forming the weld joint 336, the sheet 312 continues into a second series of forming rolls in stations that successively bend the other outer section 376 of the sheet 312 toward the shape of the second tubular portion 316 of the beam 310. As shown in FIG. 17A, the cross-sectional shape is again formed near, but prior to closing a seam of a tubular portion of the beam 310. At the intermediate cross-sectional shape shown in FIGS. 17A and 17B, the protrusions 332 are again formed at the seam in-line on the roll former so as to reduce risk of damaging or flattening the protrusions. Specifically, as shown in FIG. 17A, the outer edge portion 376a of the sheet 312 that is used to form the second tubular portion 316 of the beam 310 is spaced upward and away from the desired landing surface 382 of the sheet to allow a laser beam 384 to linearly access the landing surface 382 of the sheet 312 to form protrusions 332. The example shown in FIGS. 14-17C shows the landing surface 382 used to form the laser welded lap joint 338 at a recessed area 360 formed along the rear wall 324 at a corner of the first tubular portion 314 adjacent to the center wall 318.

As further shown in FIG. 17A, the rear corner 386 of the second tubular portion 316 on the opposing side of the tubular portion 316 from the weld joint 336 may be used as a single articulation point on the sheet. The sheet may be bent about the rear corner 386 to rotate the edge portion 376a of the sheet down into abutting engagement with the protrusions 332 formed at the landing surface 382, as shown in FIG. 17C. Accordingly, as shown in FIG. 17A, the cross-sectional shape may be formed to have essentially all desired shapes and formations of the second tubular portion 316 made in the outer section 376 of the metal sheet prior to forming the protrusions 332 on the landing surface 382, such that only a final additional bend is needed at the rear corner 386 to close and complete the shape of the second tubular portion 316. It is also contemplated that additional or alternative articulation points may be utilized on another example of the beam from that shown in FIGS. 17A-17C, such as a beam with an alternative cross-sectional shape or roll forming sequence.

Figure 17B:
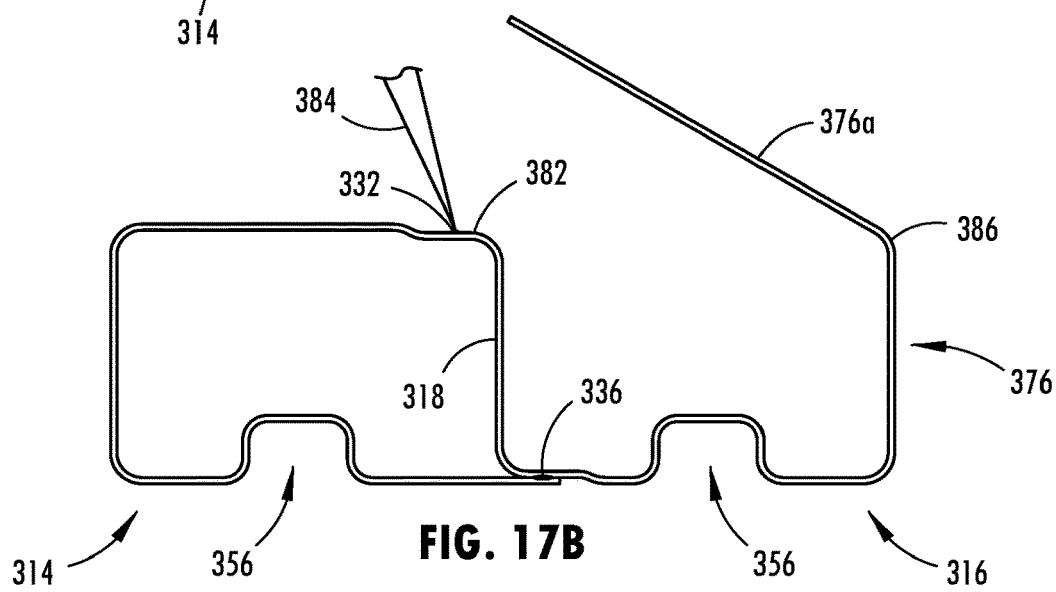
FIG. 17B is a cross-sectional view of the partially formed beam of FIG. 17A at a laser station that is forming dimples over another engagement surface of the metal sheet.
Figure 17C:
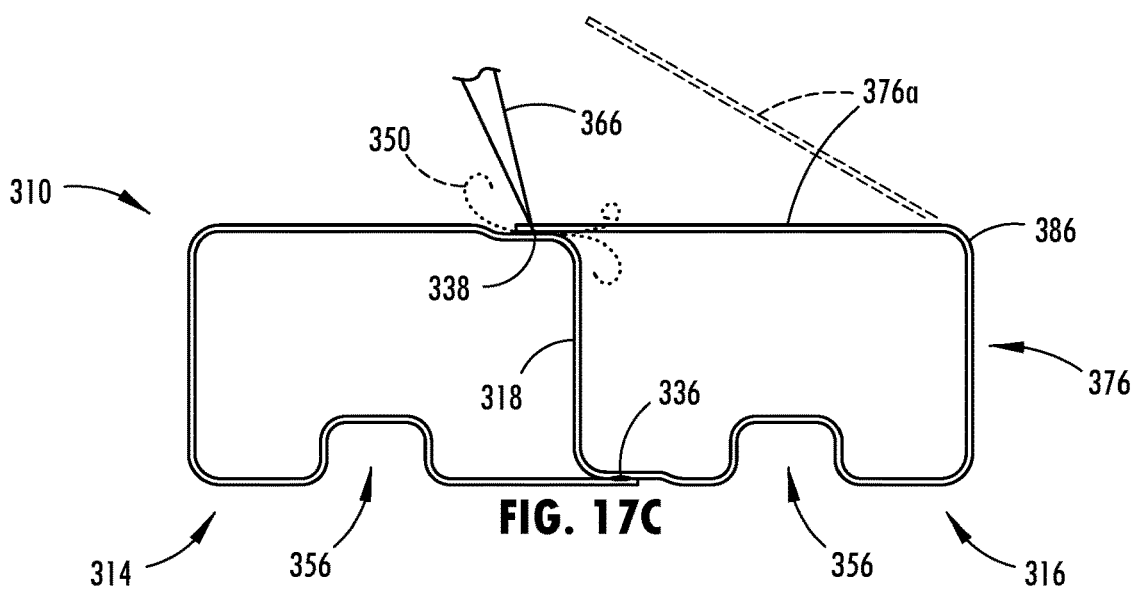
FIG. 17C is a cross-sectional view of the formed reinforcement beam of FIG. 14 at a laser station that is welding an edge of the metal sheet to the engagement surface and enclosing a second tubular portion of the reinforcement beam.

As shown in FIG. 17B, the protrusions 332 may be formed when the metal sheet continuously passes through a laser head station that is arranged in-line on the roll former, between roll form dies. The protrusions 332 shown in FIG. 17B may again otherwise be formed in the same or similar manner to those shown in FIGS. 5A-5C and described above. To form the protrusions 332, the laser beam 384 may be angled at a nearly perpendicular orientation relative to the landing surface 382. Similarly, the laser beam 366 used when forming the corresponding weld joint 336 may be substantially perpendicular to the landing surface 382.

Prior to welding the seam of the second tubular portion 316 of the beam 310, one or more forming rolls may further form the outer section 376 of the metal sheet 312 to bend and rotate the edge portion 376a about the rear corner 386 and place the outer edge 376a in contact with the line of protrusions 332 on the landing surface 382 in the recessed area 360, as shown in FIG. 17C. The recessed area 360 allows the rear walls 324, 326 of the beam 310 to be disposed in generally planar alignment with each other. The line of contact of the protrusions 332 against the edge portion 376a of the metal sheet 312 provides longitudinal spacing between the protrusions 332 that create ventilation openings for zinc oxide fumes generated from welding to escape the interior of the respective tubular portion 316 of the beam 310. The separation between the planar portions of the sheet created by the protrusions 332 is approximately between 50 micrometers and 300 micrometers. The protrusions 332, thus, form a ventilation seam configured for continuously laser welding the galvanized sheet that is continuously roll formed to a tubular-shaped beam 310. The ventilation openings allow fumes that would otherwise be trapped in an enclosed area of a tube to freely escape, so as to have a consistent weld that is free of gas openings or pockets that can form with pressured gases, such as zinc oxide gas.

With the outer portion 376a near or in engagement with the landing surface 382, the metal sheet 312 may enter a welding station that may use external mandrels to hold the shape of cross-section for welding with a laser beam 366, but otherwise be free of internal mandrels due to the position of the weld joint at a lap joint unaffected by external mandrel forces applied around the beam 312. As shown in FIG. 17C, the laser welded lap joint 338 includes a thickness that separates a planar surface of the edge portion from a planar surface of the rear wall 324, where the thickness of the weld joint 338 is formed by the protrusions 332 that protrude from the planar surface of the rear wall 324 (and/or the edge portion), such that when welding the lap joint, zinc oxide fumes 350 escape the interior of the respective tubular portion 316 of the beam through vent openings formed by the protrusions 332. Accordingly, to form a second tubular portion 316, the forming rolls may deform the remaining section 376, such as slightly less than "half" of the width of the sheet, in the opposite rotational direction from the forming rolls that formed the first tubular portion 314.

The beam 310 is made from a sheet 312 of steel material having a thickness of 0.8 mm to 1.4 mm or approximately between 1 mm and 1.5 mm. Also, the sheet 312 may have a tensile strength of about 800 to 2000 MPa (i.e. about 120 to 290 ksi). However, it is contemplated that the present beam can be made of different materials, including AHSS (Advanced High Strength Steels) and that it can be made from a sheet having a thickness of about 0.8 mm to 3.0 mm thick (or such as 0.8 mm to 1.4 mm thickness), and can be made in different beam cross-sectional sizes, such as about 80 mm to 150 mm high, and 30 mm to 60 mm deep, and having a variable sized length for the desired application.

Figure 18:
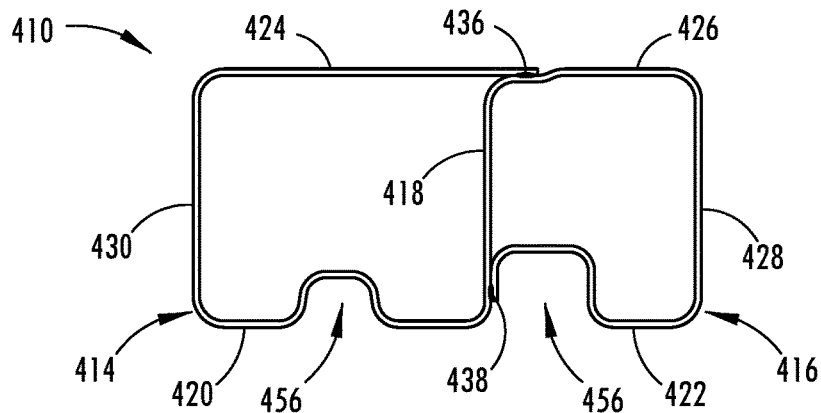
FIG. 18 is a cross-sectional view of yet an additional reinforcement beam.
Figure 19A:
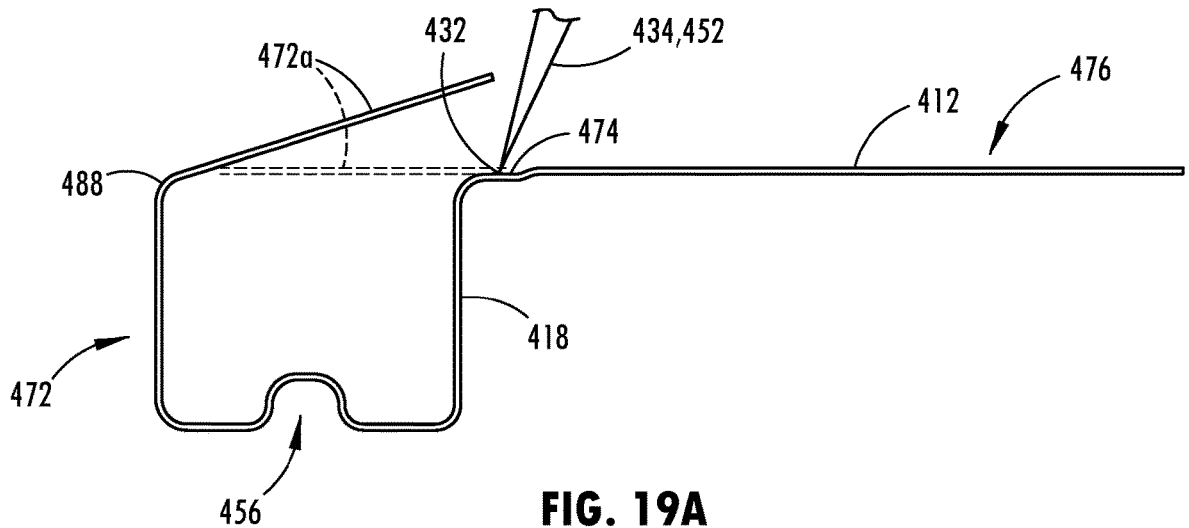
FIG. 19A is a cross-sectional view of a partially formed beam at a stage in forming the reinforcement beam shown in FIG. 18, showing a laser station location for enclosing a tubular portion of the reinforcement beam.
Figure 19B:
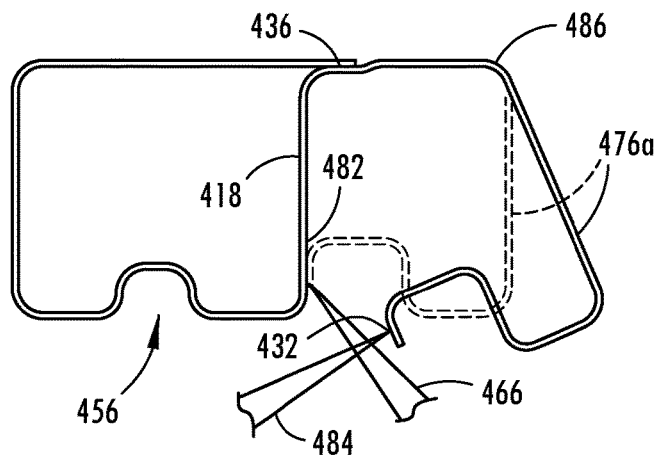
FIG. 19B is a cross-sectional view of the partially formed beam of FIG. 19A with the metal sheet further formed toward the shape of the reinforcement beam shown in FIG. 18, showing another laser station location for enclosing a second tubular portion of the reinforcement beam.

Referring now to FIGS. 18-19B, an additional example of a galvanized multi-tubular beam 410 is shown having two adjacent tubular portions 414, 416 that share a common center wall 418 of the beam 410. The beam 410 has a laser welded lap joint 436 formed in a recessed area to allow the rear walls 424, 426 of the beam 410 to be disposed in generally planar alignment with each other. The beam 410 also has a weld joint 438 formed in the seam between the center wall 418 and the front wall 422 to enclose the second tubular portion 416.

The formed beam 410 shown in FIG. 18 may be rotated about its longitudinal axis to be oriented similar to the beam 10 shown in FIG. 2, such as for use as a bumper reinforcement beam, whereby the respective walls of the beam 410 may be referenced as front walls 420, 422, rear walls 424, 426, an upper wall 428, and a lower wall 430. The front walls 420, 422 of the adjacent tubular portions 414, 416 are substantially aligned with each other so as to form an outward facing or impact surface of the beam when used as a bumper reinforcement beam. Similarly, the rear walls 424, 426 are in general alignment with each other and are substantially parallel with the front walls 420, 422. Further, the upper and lower walls 428, 430 are substantially parallel with each other and the center wall 318 and generally perpendicular with the front and rear walls 420, 422, 424, 426. It is understood that additional examples of the beam 410 may assume various orientations from that shown in FIG. 18 and may include alternative cross-sectional shapes and dimensional proportions, such as for different uses and applications of the beam.

Referring now to FIG. 19A, the galvanized sheet stock 412 may be roll formed through a series of roll dies to form a cross-sectional shape, as shown in solid lines, that is achieved prior to closing the seam that is welded to enclose the first tubular portion 414 (FIG. 18). In this illustrated example, the protrusions 432 that are formed at the seam are formed in-line on the roll former after passing through several roll form dies on the roll form line. By roll forming the sheet stock 412 to achieve an intermediate cross-sectional shape of the beam 410 prior to forming protrusions 432, the protrusions can then be formed without a risk of being damaged or flattened from passing through roll form dies prior to being utilized at the weld seam. Specifically, as shown in FIG. 19A, the outer edge portion 472a of the sheet 412 that is used to form the first tubular portion 414 of the beam 410 is spaced upward and away from the desired landing surface 474 of the sheet to allow a laser beam 434 to linearly access the landing surface 474 of the sheet 412 to form protrusions 432.

As further shown in FIG. 19A, the rear corner 488 of the tubular portion 414 may be used as a single articulation point on the sheet after the protrusions 432 are formed. As shown in dashed lines, the sheet may be bent about the rear corner 488 to rotate the edge portion 472a of the sheet down into abutting engagement with the protrusions 432 at the landing surface 474. Accordingly, the cross-sectional shape may be formed to have essentially all desired shapes and formations of the first tubular portion 414 made in the outer section 472 of the metal sheet prior to forming the protrusions 432, such that only a final additional bend is needed at the rear corner 488 to close and complete the shape of the first tubular portion 414.

The protrusions 432 may be formed at a surface that corresponds with a portion of the sheet 412 that is desired to have a weld joint, such as at the landing surface 474 of the formed metal sheet 412 shown in FIG. 19A. The landing surface 474 used to form the laser welded lap joint 436 is deposed at a recessed area formed along the rear wall 426 at a corner of the second tubular portion 416 adjacent to the center wall 418. The protrusions 432 may be formed when the metal sheet continuously passes through a laser head station that is arranged in-line on the roll former, between roll form dies. To form the protrusions 432, the laser beam 434 may be angled at a nearly perpendicular orientation relative to the landing surface 474. The protrusions 432 formed in-line on the roll former may be disposed at generally consistent intervals linearly along a longitudinal extent of the sheet 412 and may otherwise be formed in the same or similar manner to those shown in FIGS. 5A-5C and described above.

Prior to welding the seam of the first tubular portion 414 of the beam 410, one or more forming rolls may further form the outer section 472 of the metal sheet 412 to bend and rotate the edge portion 472a about the rear corner 488 and place the outer edge 472a in contact with the line of protrusions 432 on the landing surface 474, as shown in FIG. 19A in dashed lines. The line of contact of the protrusions 432 against the edge portion 472a of the metal sheet 412 provides longitudinal spacing between the protrusions 432 that create ventilation openings for zinc oxide fumes generated from welding to escape the interior of the respective tubular portion 414 of the beam 410.

With the outer portion 472a near or in engagement with the landing surface 474, the metal sheet 412 may enter a welding station that may use external mandrels to hold the shape of cross-section for welding, but otherwise be free of internal mandrels due to the cross-sectional shape of the first tubular portion 414. As shown in dashed lines in FIG. 19A, the weld joint 436 is formed via laser welding with a laser beam 452 along the ventilation seam so as to provide a seam that is attached and closed continuously along the length of the beam 410. When welding, the laser beam 452 may be disposed at the same or similar orientation to the laser beam 434 used to form the protrusions 432. Due to the protrusions 432 that form the ventilation openings, the weld joint 436 may have a thickness, such as approximately between 50 micrometers and 300 micrometers, which slightly separates a planar surface of the edge portion 472a of the outer section 472 from a planar surface of the landing surface 474. The substantially perpendicular orientation of the laser beam 452 further forms the weld joint 436 with a relatively narrow heat affect zone, such as approximately between 1 mm and 2 mm as shown in FIG. 7G.

With reference to FIG. 19B, after forming the weld joint 436, the sheet 412 continues into a second series of forming rolls in stations that successively bend the other outer section 476 of the sheet 312 (FIG. 19A) further toward the shape of the second tubular portion 416 of the beam 410. The cross-sectional shape may be formed near, but prior to closing a seam of the tubular portion 416 of the beam 410. At the intermediate cross-sectional shape shown in solid lines in FIG. 19B, the protrusions 432 may be formed at the formed tip area of the outer edge portion 476a, whereby the protrusions 432 are formed after the shape of the edge portion 476a is formed so as to reduce risk of damaging or flattening the protrusions. Specifically, as shown in FIG. 19B, the outer edge portion 476a of the sheet 412 that is used to form the second tubular portion 416 of the beam 410 is spaced downward and away from the desired landing surface 482 of the sheet to allow a laser beam 484 to linearly and generally perpendicularly contact the surface of the tip area of the outer edge portion 476a of the sheet 412 to form the protrusions 432. Alternatively, it is contemplated that the protrusions may be formed at a lower area of the center wall on the opposing contact surface of the resulting weld joint.

As further shown in FIG. 19B, the rear corner 486 of the second tubular portion 416 may be used as a single articulation point on the sheet. The sheet may be bent about the rear corner 486 to rotate the formed edge portion 476a of the sheet down into abutting engagement with the protrusions 432 formed at the landing surface 482, as shown in FIG. 19B in dashed lines. Accordingly, the cross-sectional shape may be formed to have essentially all desired shapes and formations of the second tubular portion 416 made in the outer section 476 of the metal sheet prior to forming the protrusions 432, such that only a final additional bend is needed at the rear corner 486 to close and complete the shape of the second tubular portion 416. It is also contemplated that additional or alternative articulation points may be utilized on another example of the beam from that shown in FIGS. 19A and 19B, such as a beam with an alternative cross-sectional shape or roll forming sequence.

As shown in FIG. 19B, the protrusions 432 may be formed when the metal sheet continuously passes through a laser head station that is arranged in-line on the roll former, between roll form dies. The protrusions 432 shown in FIG. 19B may again otherwise be formed in the same or similar manner to those shown in FIGS. 5A-5C. Prior to welding the seam of the second tubular portion 416 of the beam 410, one or more forming rolls may further form the outer section 476 of the metal sheet 412 to bend and rotate the edge portion 476a about the rear corner 486 and place the outer edge 476a in contact with the landing surface 482 disposed at the center wall 418, as shown in dashed lines in FIG. 19B. Again, the line of contact of the protrusions 432 on the edge portion 476a of the metal sheet 412 against the center wall 418 provides longitudinal spacing between the protrusions 432 that create ventilation openings for zinc oxide fumes generated from welding the seam 438, such as with a laser beam 466, to escape the interior of the respective tubular portion 416 of the beam 410. The ventilation openings allow fumes that would otherwise be trapped in an enclosed area of a tube to freely escape, so as to have a consistent weld that is free of gas openings or pockets that can form with pressured gases, such as zinc oxide gas.

The beam 410 may be made from a sheet 412 of steel material having a thickness of 0.8 mm to 1.4 mm or approximately between 1 mm and 1.5 mm. Also, the sheet 412 may have a tensile strength of about 800 to 2000 MPa (i.e. about 120 to 290 ksi). However, it is contemplated that the present beam can be made of different materials, including AHSS (Advanced High Strength Steels) and that it can be made from a sheet having a thickness of about 0.8 mm to 3.0 mm thick (or such as 0.8 mm to 1.4 mm thickness), and can be made in different beam cross-sectional sizes, such as about 80 mm to 150 mm high, and 30 mm to 60 mm deep, and having a variable sized length for the desired application.

With reference to FIGS. 20 and 20A, another example of a galvanized multi-tubular beam 510 is shown having two adjacent tubular portions 514, 516 that share a common center wall 518 of the beam 510. The beam 510 has a laser welded crevice joints 537 formed in the seams between the center wall 518 and the front walls 520, 522 and the rear walls 524, 526 to enclose the tubular portions 514, 516. The weld joints 537 formed via laser welding along the ventilation seam by the laser beam 566 by directing the laser into the respective crevice seams generally perpendicular to the orientation of the front and rear walls 520, 522, 524, 526. Also protrusions may be provided in the crevice seams to form ventilation openings for zinc oxide fumes generated from the welding to escape the interior of the tubular portions of the beam 510 upstream in the roll former from the welding station.

For purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A multi-tubular beam for a vehicle, the multi-tubular beam comprising:
    an elongated beam comprising a metal sheet having longitudinal bends that extend along a length of the elongated beam, the longitudinal bends shaping the metal sheet to define adjacent first and second tubular portions along the length of the elongated beam, the first and second tubular portions sharing a common center wall formed by the metal sheet;
    wherein the first and second tubular portions each include a front wall and a rear wall formed by the metal sheet, the front walls disposed on an opposing side of the elongated beam from the rear walls;
    wherein the front walls include a stiffening rib that extends linearly along the length of the elongated beam and protrudes into an interior volume of the respective first tubular portion or second tubular portion; and
    wherein a front end portion of the common center wall is attached to the stiffening rib with a weld joint having a weld material that extends through a thickness of the common center wall or the stiffening rib.

2. The multi-tubular beam of claim 1, wherein a rear end portion of the common center wall integrally extends from the rear wall of the first or second tubular portions.

3. The multi-tubular beam of claim 1, wherein the stiffening rib includes opposing side walls that integrally protrude into the interior volume and interconnect at a base wall of the stiffening rib.

4. The multi-tubular beam of claim 3, wherein the front end portion of the common center wall is welded to one of the side walls of the stiffening rib with the weld joint.

5. The multi-tubular beam of claim 1, wherein the weld material of the weld joint extends perpendicular to the common center wall.

6. The multi-tubular beam of claim 1, wherein the weld material of the weld joint comprises molten metal of the stiffening rib and the common center wall.

7. The multi-tubular beam of claim 1, wherein the weld joint comprises a heat affect zone extending outward from opposing sides of the weld material, the heat affect zone having a width less than 2 mm.

8. The multi-tubular beam of claim 1, wherein the weld joint extends continuously along the elongated beam.

9. The multi-tubular beam of claim 1, wherein the metal sheet includes a central section extending along the length of the elongated beam and outer sections extending laterally from the central section, the central section forming the common center wall of the elongated beam.

10. The multi-tubular beam of claim 9, wherein the outer sections include the longitudinal bends along the length that dispose the outer sections in opposing directions from the common central wall to form the first and second tubular portions.

11. The multi-tubular beam of claim 1, wherein the metal sheet includes opposing edge portions extending in parallel along the length of the elongated beam, and wherein a first edge portion of the opposing edge portions of the metal sheet defines the front end portion of the common center wall.

12. The multi-tubular beam of claim 11, wherein the first edge portion of the metal sheet is attached to the stiffening rib at an inside surface of the metal sheet.

13. The multi-tubular beam of claim 1, wherein the metal sheet comprises steel, and wherein the thickness of the metal sheet is less than 1.5 mm.

14. A multi-tubular beam for a vehicle, the multi-tubular beam comprising:
    an elongated beam having a metal sheet that integrally forms adjacent tubular portions with longitudinal bends in the metal sheet that extend along a length of the elongated beam, the adjacent tubular portions each enclosing an elongated interior volume;
    wherein the adjacent tubular portions share a common center wall and each include a front wall and a rear wall, the front walls disposed on an opposing side of the elongated interior volumes from the rear walls;
    wherein the front walls each include a stiffening rib formed in the metal sheet that extends along the length of the elongated beam;
    wherein the stiffening ribs each include an inner side wall and an outer side wall that integrally protrude into the respective elongated interior volume and interconnect at a base of the stiffening rib; and
    wherein a front end portion of the common center wall is attached to the inner side wall of the stiffening rib with a weld joint having a weld material that extends perpendicular to the common center wall and through the common center wall or the stiffening rib.

15. The multi-tubular beam of claim 14, wherein the weld material of the weld joint extends through the inner side wall of the stiffening rib.

16. The multi-tubular beam of claim 15, wherein the metal sheet includes a central section extending along the length of the elongated beam and outer sections extending laterally from the central section, the central section forming the common center wall of the elongated beam, the outer sections having the longitudinal bends and integrally extending in opposing directions from the common central wall to form the first and second tubular portions.

17. The multi-tubular beam of claim 16, wherein a first edge portion the metal sheet terminates at the inner side wall of the stiffening rib to define an edge of the metal sheet.

18. A multi-tubular beam for a vehicle, the multi-tubular beam comprising:
    an elongated beam comprising a metal sheet having longitudinal bends that extend along a length of the elongated beam, the longitudinal bends shaping the metal sheet to define adjacent first and second tubular portions along the length of the elongated beam, the first and second tubular portions sharing a common center wall formed by the metal sheet;
    wherein the first and second tubular portions each include a front wall and a rear wall formed by the metal sheet, the front walls disposed on an opposing side of the elongated beam from the rear walls;

wherein the front wall of the first tubular portion includes a stiffening rib that extends linearly along the length of the elongated beam and protrudes into an interior volume of the first tubular portion;

wherein the metal sheet includes a first edge portion that defines a front end portion of the common center wall; and wherein the front end portion of the common center wall is attached to the stiffening rib with a weld joint having a weld material that extends through a side wall of the stiffening rib.

19. The multi-tubular beam of claim 18, wherein a rear end portion of the common center wall integrally extends from the rear wall of the first tubular portion.

20. The multi-tubular beam of claim 18, wherein a second edge portion of the metal sheet integrally extends the rear wall of the second tubular portion and attaches to the first tubular portion.

* * * * *